US011435200B2

(12) United States Patent
Nagy et al.

(10) Patent No.: US 11,435,200 B2
(45) Date of Patent: Sep. 6, 2022

(54) AUTONOMOUS VEHICLE ROUTING WITH LOCAL AND GENERAL ROUTES

(71) Applicant: UATC, LLC, San Francisco, CA (US)

(72) Inventors: Bryan John Nagy, Allison Park, PA (US); Michael Voznesensky, San Francisco, CA (US); Brent Goldman, San Francisco, CA (US); Robert Michael S Dean, North Bethesda, MD (US); Jian Wen, Pittsburgh, PA (US); Yanbo Zhao, Wexford, PA (US)

(73) Assignee: UATC, LLC, San Francisco, CA (US)

( * ) Notice: Subject to any disclaimer, the term of this patent is extended or adjusted under 35 U.S.C. 154(b) by 107 days.

(21) Appl. No.: 16/752,242

(22) Filed: Jan. 24, 2020

(65) Prior Publication Data
US 2020/0239025 A1 Jul. 30, 2020

Related U.S. Application Data

(60) Provisional application No. 62/796,873, filed on Jan. 25, 2019, provisional application No. 62/796,840, filed on Jan. 25, 2019.

(51) Int. Cl.
G01C 21/34 (2006.01)
B60W 60/00 (2020.01)
(Continued)

(52) U.S. Cl.
CPC ....... G01C 21/3453 (2013.01); B60W 60/001 (2020.02); B60W 60/0011 (2020.02);
(Continued)

(58) Field of Classification Search
CPC ........... G01C 21/3453; G01C 21/3446; B60W 60/0011; B60W 60/001; G05D 1/0088;
(Continued)

(56) References Cited

U.S. PATENT DOCUMENTS 5,938,720 A 8/1999 Tamai
2012/0253856 A1 10/2012 Francis
(Continued)

FOREIGN PATENT DOCUMENTS

| EP | 0854353 | 7/1998 |
|---|---|---|
| WO | 2020154670 | 7/2020 |
| WO | 2020154670 | 9/2021 |

OTHER PUBLICATIONS

"International Application Serial No. PCT US2020 015066, International Search Report dated May 18, 2020", 4 pgs.
(Continued)

Primary Examiner — Paula L Schneider
(74) Attorney, Agent, or Firm — Schwegman Lundberg & Woessner, P.A.

(57) ABSTRACT

Various examples are directed to systems and methods for controlling an autonomous vehicle. For example, a navigator system at an autonomous vehicle may generate a plurality of local routes beginning at a vehicle location and extending to a plurality of local route end points. The navigator system may access general route cost data, the general route cost data describing general route costs from the plurality of local route end points to a trip end point. The navigator system may select the first local route of the plurality of routes based at least in part on the general route cost data. A vehicle autonomy system at the autonomous vehicle may begin to control the autonomous vehicle along the first local route.

20 Claims, 16 Drawing Sheets

(51) Int. Cl.
  *G05D 1/00* (2006.01)
  *G05D 1/02* (2020.01)
  *G08G 1/0968* (2006.01)

(52) U.S. Cl.
  CPC ......... *G05D 1/0088* (2013.01); *G05D 1/0212* (2013.01); *G05D 1/0287* (2013.01); *G08G 1/096833* (2013.01); *G05D 2201/0213* (2013.01)

(58) Field of Classification Search
  CPC ............... G05D 1/0212; G05D 1/0287; G05D 2201/0213; G08G 1/096833
  USPC .......................................................... 701/25
  See application file for complete search history.

(56) References Cited

U.S. PATENT DOCUMENTS

| | | | |
|---|---|---|---|
| 2015/0345966 A1* | 12/2015 | Meuleau | G01C 21/3453 701/23 |
| 2016/0075333 A1 | 3/2016 | Sujan et al. | |
| 2018/0247537 A1 | 8/2018 | Oh et al. | |
| 2018/0275648 A1 | 9/2018 | Ramalingam | |
| 2019/0080266 A1 | 3/2019 | Zhu et al. | |
| 2019/0286151 A1 | 9/2019 | Palanisamy et al. | |
| 2020/0240800 A1 | 7/2020 | Voznesensky et al. | |

OTHER PUBLICATIONS

"International Application Serial No. PCT US2020 015066, Written Opinion dated May 18, 2020", 6 pgs.

"International Application Serial No. PCT US2020 015066, International Preliminary Report on Patentability dated Aug. 5, 2021", 8 pgs.

"U.S. Appl. No. 16/752,199, Non Final Office Action dated Oct. 18, 2021", 78 pgs.

"U.S. Appl. No. 16/752,199, Response filed Feb. 18, 2022 to Non Final Office Action dated Oct. 18, 2021", 18 pgs.

"U.S. Appl. No. 16/752,199, Examiner Interview Summary dated Feb. 24, 2022", 3 pgs.

"European Application Serial No. 20707952.6, Response to Communication persuant to Rules 161 and 162 filed Feb. 22, 2022", 14 pgs.

* cited by examiner

AUTONOMOUS VEHICLE ROUTING WITH LOCAL AND GENERAL ROUTES

CLAIM FOR PRIORITY

This application claims the benefit of priority of U.S. Provisional Application Ser. No. 62/796,840, filed Jan. 25, 2019, U.S. Provisional Application Ser. No. 62/796,873, filed Jan. 25, 2019, each of which are hereby incorporated by reference in their entireties.

FIELD

This document pertains generally, but not by way of limitation, to devices, systems, and methods for operating and/or managing an autonomous vehicle according to a route.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
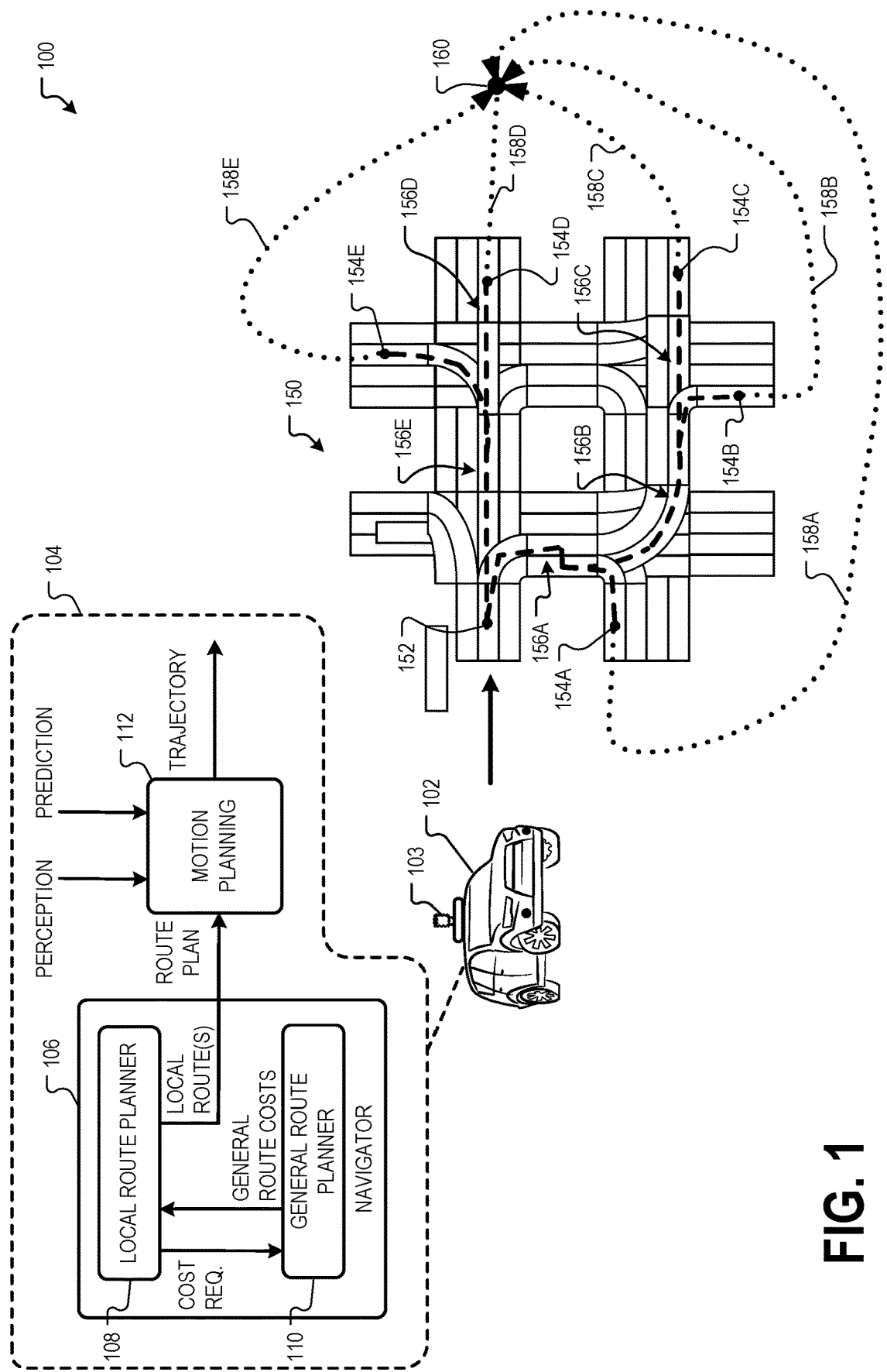
FIG. 1 is a diagram showing one example of an environment for generating routes using a local route planner and a general route planner.

Examples described herein are directed to systems and methods for routing autonomous vehicles. In an autonomous or semi-autonomous vehicle (collectively referred to as an autonomous vehicle (AV)), a vehicle autonomy system, sometimes referred to as an AV stack, controls one or more vehicle controls, such as braking, steering, or throttle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

An autonomous vehicle executes a trip by traversing from a trip start point to a trip endpoint. For some trips, the vehicle picks up a passenger or cargo at the trip start point and drops off the passenger or cargo at the trip endpoint. Examples of cargo can include food, packages, and the like. A navigator system generates routes for an autonomous vehicle. A route is a path that an autonomous vehicle takes, or plans to take, over one or more roadways to execute a trip. For example, a route can extend from a trip start point to a trip endpoint. Some trips also include one or more waypoints. The autonomous vehicle can be routed to the waypoints between the trip start point and the trip endpoint.

In some examples, a route includes a series of connected roadway elements, sometimes also referred to as lane segments. Each roadway element corresponds to a portion of a roadway that can be traversed by the autonomous vehicle. A roadway element can be or include different subdivisions of a roadway, depending on the implementation. In some examples, the roadway elements are or include road segments. A road segment is a portion of roadway including all lanes and directions of travel. Consider a four-lane divided highway. A road segment of the four-lane divided highway includes a stretch of the highway including all four lanes and both directions of travel.

In some examples, roadway elements are or include directed road segments. A directed road segment is a portion of roadway where traffic travels in a common direction. Referring again to the four-lane divided highway example, a stretch of the highway would include at least two directed road segments: a first directed road segment including the two lanes of travel in one direction and a second directed road segment including the two lanes of travel in the other direction.

In some examples, roadway elements are or include lane segments. A lane segment is a portion of a roadway including one lane of travel in one direction. Referring again to the four-lane divided highway example, a portion of the divided highway may include two lane segments in each direction. Lane segments may be interconnected in the direction of travel and laterally. For example, a vehicle traversing a lane segment may travel in the direction to travel to the next connected lane segment or may make a lane change to move laterally to a different lane segment.

Roadway elements may be described by a routing graph. The routing graph includes graph elements, where each graph element has a corresponding roadway element. The routing graph indicates connectivity between graph elements and a cost for the vehicle to traverse roadway elements corresponding to different graph elements and/or to traverse between such roadway elements. The navigator system can generate a route, for example, by finding the lowest cost combination of roadway elements between the trip start point and the trip endpoint.

An example navigator system for generating autonomous vehicle routes includes a local route planner and a general route planner. The local route planner, sometimes referred to as a tactical route planner, generates routes that begin at the autonomous vehicle's location and extend to a number of local route endpoints. For example, the local route planner can generate different local routes by beginning at a vehicle location graph element and adding connected roadway elements until one or more termination parameters are met. The termination parameters can include, for example, a threshold distance from the vehicle location graph element, a threshold number of roadway elements, a threshold number of direction changes, etc.

The local route planner sends a general route cost request to the general route planner. The general route cost request includes, for example, the local route endpoints. The general route planner determines general routes from each of the local route endpoints to a trip endpoint. The general route planner also determines a general route cost for each of the determined general routes. Accordingly, some or all of the local route endpoints are associated with general route costs.

The navigator system uses the general route costs in conjunction with local route costs to select one or more local routes. For example, the navigator system may select a local route associated with the lowest total cost to the trip endpoint and/or a set of local routes having the lowest total cost to the trip endpoint (e.g., the two lowest cost local routes, the three lowest-cost local routes, etc.). The selected local or routes are used by a vehicle autonomy system to direct an autonomous vehicle.

Generating autonomous vehicle routes as described herein can provide a number of advantages. For example, it may take less time and/or fewer computing resources to generate local routes than it does to generate a full route. Accordingly, generating local routes on-the-fly may allow an autonomous vehicle to react to changing roadway conditions faster. Also separating the functionality of the local route planner and the general route planner may, in some examples, support an arrangement in which the general route planner is implemented remotely from the autonomous vehicle. This can reduce the need for computing resources at the autonomous vehicle which, in turn, can reduce the price of the vehicles.

FIG. 1 is a diagram showing one example of an environment 100 for generating routes using a local route planner 108 and a general route planner 110. The environment 100 includes a vehicle 102 including a vehicle autonomy system 104. The vehicle autonomy system 104 includes a navigator system 106 configured to generate routes using a local route planner 108 and a general route planner 110 as described herein.

The vehicle 102 can be a passenger vehicle, such as a truck, car, bus or other similar vehicle. The vehicle 102 can also be a delivery vehicle, such as a van, a truck, a tractor trailer, etc. The vehicle 102 is a self-driving vehicle (SDVs) or autonomous vehicle (AVs). For example, the vehicle 102 includes a vehicle autonomy system, described in more detail with respect to FIG. 3, that is configured to operate some or all the controls of the vehicle 102 (e.g., acceleration, braking, steering).

In some examples, the vehicle 102 is operable in different modes where the vehicle autonomy system 104 has differing levels of control over the vehicle 102 in different modes. For example, the vehicle 102 may be operable in a fully autonomous mode in which the vehicle autonomy system 104 has responsibility for all or most of the controls of the vehicle 102. In some examples, the vehicle 102 is operable in a semiautonomous mode that is in addition to or instead of the full autonomous mode. In a semiautonomous mode, the vehicle autonomy system 104 is responsible for some of the vehicle controls while a human user or driver is responsible for other vehicle controls. In some examples, one or more of the autonomous vehicle 102 is operable in a manual mode in which the human user is responsible for all control of the vehicle 102. Additional details of an example vehicle autonomy system are provided herein with reference to FIG. 3.

The autonomous vehicle 102 includes one or more remote detection sensors. Remote detection sensors 103 include one or more sensors that receive return signals from the environment 100. Return signals may be reflected from objects in the environment 100, such as the ground, buildings, trees, etc. Remote-detection sensors 103 may include one or more active sensors, such as light imaging detection and ranging (LIDAR), radio detection and ranging (RADAR), and/or sound navigation and ranging (SONAR) that emit sound or electromagnetic radiation in the form of light or radio waves to generate return signals. Information about the environment 100 is extracted from the return signals. In some examples, the remote-detection sensors 103 include one or more passive sensors that receive return signals that originated from other sources of sound or electromagnetic radiation. Remote-detection sensors 103 provide remote sensor data that describes the environment 100. The autonomous vehicle 102 can also include other types of sensors, for example, as described in more detail with respect to FIG. 3.

The example of FIG. 1 also shows an example routing graph portion 150 illustrating example local routes 156A, 156B, 156C, 156D (collectively 156A-E) and corresponding general routes 158A, 158B, 158C, 158D, 158E (collectively 158A-E). A routing graph is used by a route planner (e.g., a local route planner and/or a general route planner) to generate routes for the autonomous vehicle 102. A routing graph is a graph that represents roadways as a set of graph elements. A graph element is a component of a routing graph that represents a roadway element on which the autonomous vehicle 102 can travel. A graph element can be or include an edge, node, or other component of a routing graph. A graph element represents a portion of roadway, referred to herein as a roadway element and sometimes also called a lane segment.

The routing graph portion 150 includes some or all of a routing graph representing the roadways in a geographic area. The routing graph portion 150 represents the roadways as a set of graph elements, illustrated in in FIG. 1 as boxes or shapes. The routing graph portion 150 can include data that indicates directionality, connectivity, and/or cost for various graph elements. The directionality of a graph element indicates the direction of travel in the corresponding roadway element. Connectivity between graph elements describes connections between the corresponding roadway elements that indicate possible transitions between the roadway elements. The cost of a graph element or graph elements describes a cost for the vehicle 102 to traverse the graph element and/or the cost to traverse between two graph elements. Cost can be expressed, for example, in time, risk, etc.

The example local routes 156A-E extend from a vehicle location 152 to a plurality of local route endpoints 154A, 154B, 154C, 154D, 154E (collectively 154A-E). The vehicle location 152 is a geographic location from which the local routes 156A-E begin. In some examples, the vehicle location 152 describes a roadway element including the geographic location from which the local routes 156A-E begin. The vehicle location 152 can be, in some examples, a current location of the vehicle 102. For example, the navigator system 106 can be programmed to periodically generate routes from to vehicle's current location to the trip endpoint 160. The local route endpoints 154A-E are geographic locations where the local routes end. Like the vehicle location 152, the local route endpoints 154A-E, in some examples, describe a last roadway element in the respective local routes 156A-E.

Figure 5:
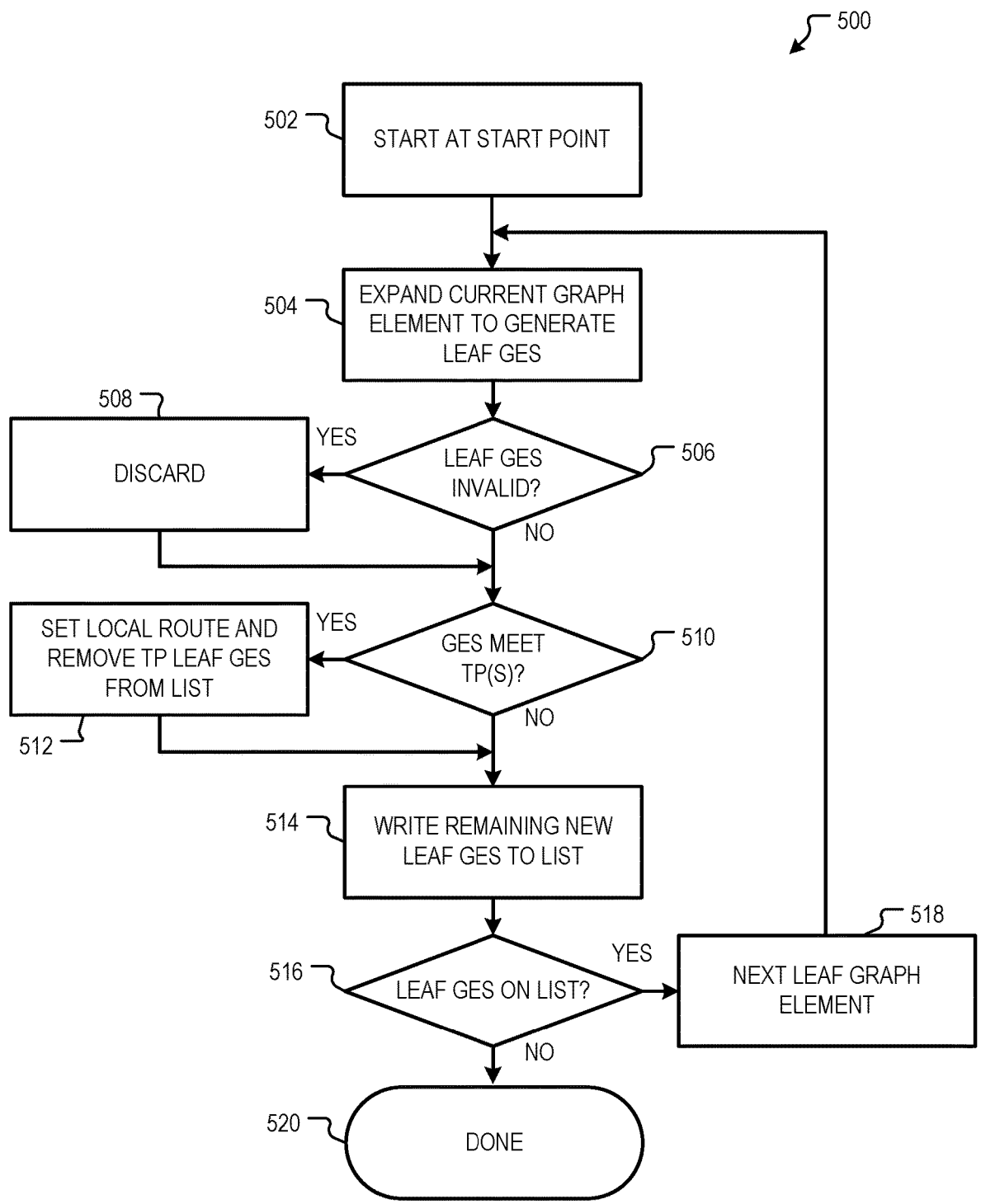
FIG. 5 is a flowchart showing one example of a process flow that can be executed by a local route planner to generate local routes.

The local route planner 108 generates the local routes 156A-E, for example, as described herein with respect to FIG. 5. The local route planner 108 may also generate local route costs for the local routes 156A-E. Local route costs may be the sum of the costs to traverse and/or travel between roadway elements making up the respective local routes 156A-E. For example, the local route cost of the local route 156A can include the sum of the costs to traverse and/or travel between roadway elements between the vehicle start point 152 and the local route endpoint 154A.

The local route planner 108 can request general route costs from the general route planner 110. General route costs are the costs from the respective local route endpoints 154A-E to a trip endpoint 160. The general route planner 110 determines general route costs, for example, by creating general routes 158A, 158B, 158C, 158D, 158E (collectively 158A-E) from the respective local route endpoints 154A-E to the trip endpoint 160. For example, general route 158A is between local route endpoint 154A and trip endpoint 160, general route 158B is between local route endpoint 154B and trip endpoint 160, and so on.

The general route planner 110 can determine the general routes 158A-E using a routing graph similar to the routing graph portion 150. For example, the general route planner 110 can determine the general routes 158A-E by finding the respective lowest cost set of graph elements from the local route endpoints 154A-E to the trip endpoint 160. For example, the general routes can be selected by applying a path planning algorithm to the routing graph to find the lowest cost route. Any suitable path planning algorithm can be used, such as, for example, A*, D*, Focused D*, D* Lite, GD*, or Dijkstra's algorithm. The respective general routes 158A-E are made up of the roadway elements corresponding to the respective lowest cost sets of graph elements.

In some examples, the local route planner 108 and general route planner 110 use the same routing graph and/or portions of the same routing graph. In other examples, the local route planner 108 and general route planner 110 can use different routing graphs or even different routing methods. For example, the local route planner 108 and general route planner 110, in some examples, use different routing graphs with graph elements corresponding to different roadway elements.

The general route planner 110 provides general route costs determined from the general routes 158A-E to the local route planner 108, for example, in response to the request for general route costs. The local route planner 108 uses the general route costs to find path-to-target costs for the respective local routes 156A-156E. A path-to-target cost includes the cost of a local route and the cost of a corresponding general route, indicated by the returned general route cost. For example, the path-to-target cost of the local route 156A includes the cost of the local route 156A and the general route cost associated with the local route endpoint 154A; the path-to-target cost of the local route 156B includes the cost of the local route 156B and the general route cost associated with the local route endpoint 154B, and so on.

The local route planner 108 selects the local route 156A-E having the lowest path-to-target cost. The vehicle autonomy system 112 controls the vehicle 102 along the lowest cost local route 156A-E towards the corresponding local route endpoint 154A-E. In some example, the selected local route is provided to a motion planning system 112. The motion planning system 112 receives a route plan including the selected local route 156A-E. The motion planning system 112 may also receive various other inputs, such as a perception input describing sensed objects around the vehicle 102 and/or a prediction input predicting the motion of objects sensed around the vehicle. The motion planning system may generate a trajectory. The trajectory is used to provide input to the vehicle controls. Additional details and example including a motion planning system are described in more detail with respect to FIG. 3.

Figure 2:
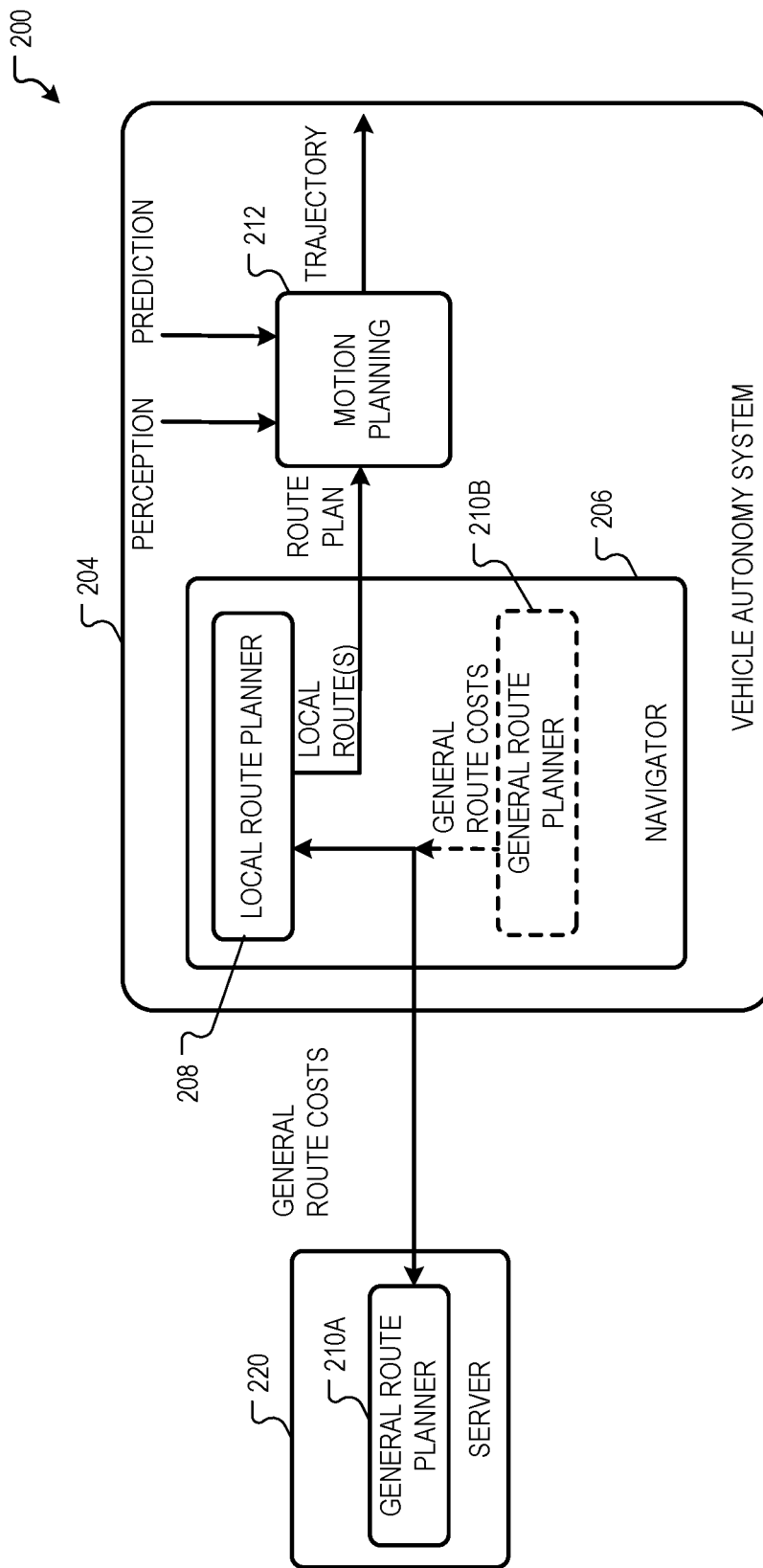
FIG. 2 is a diagram showing one example of an environment including a vehicle autonomy system and a remote server.

In the example of FIG. 1, the local route planner 108 and general route planner 110 are implemented at a local navigator system 106 implemented at the vehicle 102. In some examples, however, a general route planner can be implemented remote from an autonomous vehicle. FIG. 2 is a diagram showing one example of an environment 200 including a vehicle autonomy system 204 and a remote server 220. The vehicle autonomy system 204 can be used to control a vehicle, such as the vehicle 102 of FIG. 1. The vehicle autonomy system 204 includes a navigator system 206 that includes a local route planner 208 that may operate in a manner similar to that of the local route planner 108 of FIG. 1. For example, the local route planner 208 can generate local routes from a vehicle location to a plurality of local route endpoints. The local route planner 208 and requests global costs for the local route endpoints, as described with respect to FIG. 1.

The remote server 220 executes a general route planner 210A. The general route planner 210A may operate in a manner similar to that of the general route planner 110 of FIG. 1. For example, the general route planner 210A receives a general cost request including a set of local route endpoints. The general route planner 210A determines general routes from the respective local route endpoints and corresponding general route costs. The general route costs are returned to the local route planner 208, which generates one or more local routes and provides the one or more local routes to a motion planning system 212.

In some examples, the local route planner 208 provides a general route cost request directly to the general route planner 210A at the remote server 220. In other examples, the local route planner 208 provides the general route cost request to an optional onboard general route planer 210B that forwards the general route request to the remote general route planner 210A. In some examples, the onboard general route planner 210B determines whether the remote general route planner 210A is available and/or reachable. If the remote general route planner 210A is not available or not reachable, the onboard general route planner 210B may generate general route costs.

Executing the remote general route planner 210A, as shown in FIG. 2, can provide various advantages. For example, the general route planner can consider transient data, such as weather data, traffic data, other roadway condition data, etc. when generating general route costs. Implementing the general route planner 210A at a central server 220 may allow transient data to be considered without downloading all of the transient data to individual vehicles.

Figure 3:
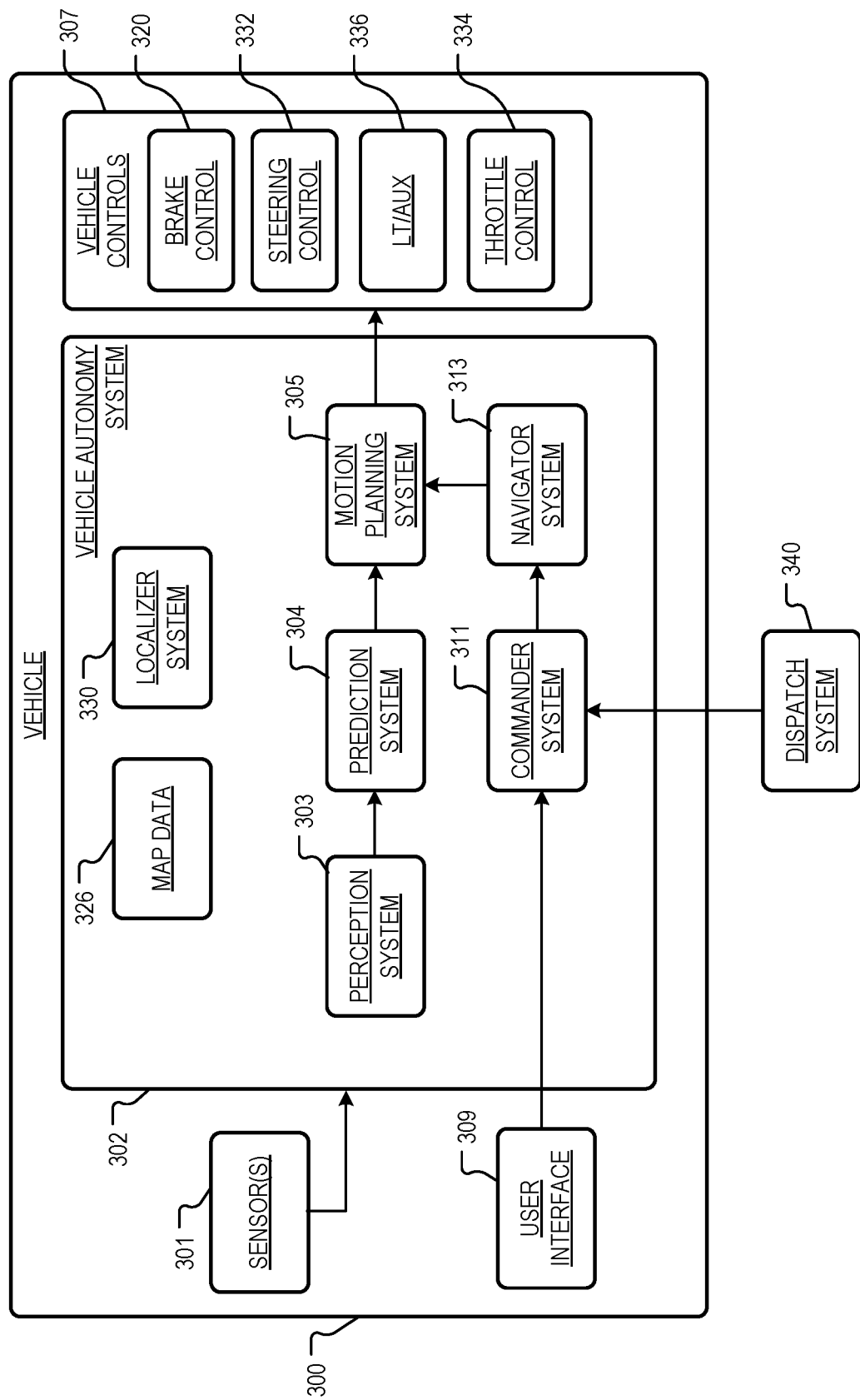
FIG. 3 depicts a block diagram of an example vehicle according to example aspects of the present disclosure.

FIG. 3 depicts a block diagram of an example vehicle 300 according to example aspects of the present disclosure. The vehicle 300 includes one or more sensors 301, a vehicle autonomy system 302, and one or more vehicle controls 307. The vehicle 300 is an autonomous vehicle, as described herein. The example vehicle 300 shows just one example arrangement of an autonomous vehicle. In some examples, autonomous vehicles of different types can have different arrangements.

The vehicle autonomy system 302 includes a commander system 311, a navigator system 313, a perception system 303, a prediction system 304, a motion planning system 305, and a localizer system 330 that cooperate to perceive the surrounding environment of the vehicle 300 and determine a motion plan for controlling the motion of the vehicle 300 accordingly.

The vehicle autonomy system 302 is engaged to control the vehicle 300 or to assist in controlling the vehicle 300. In particular, the vehicle autonomy system 302 receives sensor data from the one or more sensors 301, attempts to comprehend the environment surrounding the vehicle 300 by performing various processing techniques on data collected by the sensors 301, and generates an appropriate route through the environment. The vehicle autonomy system 302 sends commands to control the one or more vehicle controls 307 to operate the vehicle 300 according to the route.

Various portions of the vehicle autonomy system 302 receive sensor data from the one or more sensors 301. For example, the sensors 301 may include remote-detection sensors as well as motion sensors such as an inertial measurement unit (IMU), one or more encoders, or one or more odometers. The sensor data includes information that describes the location of objects within the surrounding environment of the vehicle 300, information that describes the motion of the vehicle 300, etc.

The sensors 301 may also include one or more remote-detection sensors or sensor systems, such as a LIDAR, a RADAR, one or more cameras, etc. As one example, a LIDAR system of the one or more sensors 301 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 301 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 301 may generate sensor data (e.g., remote sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 301 can include a positioning system. The positioning system determines a current position of the vehicle 300. The positioning system can be any device or circuitry for analyzing the position of the vehicle 300. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points) and/or other suitable techniques. The position of the vehicle 300 can be used by various systems of the vehicle autonomy system 302.

Thus, the one or more sensors 301 are used to collect sensor data that includes information that describes the location (e.g., in three-dimensional space relative to the vehicle 300) of points that correspond to objects within the surrounding environment of the vehicle 300. In some implementations, the sensors 301 can be positioned at various different locations on the vehicle 300. As an example, in some implementations, one or more cameras and/or LIDAR sensors can be located in a pod or other structure that is mounted on a roof of the vehicle 300 while one or more RADAR sensors can be located in or behind the front and/or rear bumper(s) or body panel(s) of the vehicle 300. As another example, camera(s) can be located at the front or rear bumper(s) of the vehicle 300. Other locations can be used as well.

The localizer system 330 receives some or all of the sensor data from sensors 301 and generates vehicle poses for the vehicle 300. A vehicle pose describes a position and attitude of the vehicle 300. The vehicle pose (or portions thereof) can be used by various other components of the vehicle autonomy system 302 including, for example, the perception system 303, the prediction system 304, the motion planning system 305 and the navigator system 313.

The position of the vehicle 300 is a point in a three-dimensional space. In some examples, the position is described by values for a set of Cartesian coordinates, although any other suitable coordinate system may be used. The attitude of the vehicle 300 generally describes the way in which the vehicle 300 is oriented at its position. In some examples, attitude is described by a yaw about the vertical axis, a pitch about a first horizontal axis, and a roll about a second horizontal axis. In some examples, the localizer system 330 generates vehicle poses periodically (e.g., every second, every half second). The localizer system 330 appends time stamps to vehicle poses, where the time stamp for a pose indicates the point in time that is described by the pose. The localizer system 330 generates vehicle poses by comparing sensor data (e.g., remote sensor data) to map data 326 describing the surrounding environment of the vehicle 300.

In some examples, the localizer system 330 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 330 generates vehicle poses. Accordingly, the pose filter generates some vehicle poses by extrapolating from a previous pose estimate utilizing motion sensor data.

Vehicle poses and/or vehicle positions generated by the localizer system 330 are provided to various other components of the vehicle autonomy system 302. For example, the commander system 311 may utilize a vehicle position to determine whether to respond to a call from a dispatch system 340.

The commander system 311 determines a set of one or more target locations that are used for routing the vehicle 300. The target locations are determined based on user input received via a user interface 309 of the vehicle 300. The user interface 309 may include and/or use any suitable input/output device or devices. In some examples, the commander system 311 determines the one or more target locations considering data received from the dispatch system 340. The dispatch system 340 is programmed to provide instructions to multiple vehicles, for example, as part of a fleet of vehicles for moving passengers and/or cargo. Data from the dispatch system 340 can be provided via a wireless network, for example.

The navigator system 313 receives one or more target locations from the commander system 311 and map data 326. Map data 326, for example, provides detailed information about the surrounding environment of the vehicle 300. Map data 326 provides information regarding identity and location of different roadway elements. A roadway is a place where the vehicle 300 can drive and may include, for example, a road, a street, a highway, a lane, a parking lot, or a driveway. Routing graph data is a type of map data 326.

From the one or more target locations and the map data 326, the navigator system 313 generates route data describing a route for the vehicle to take to arrive at the one or more target locations. In some implementations, the navigator system 313 determines route data using one or more path planning algorithms based on costs for graph elements, as described herein. For example, a cost for a route can indicate a time of travel, risk of danger, or other or other factor associated with adhering to a particular candidate route. For example, the reward can be of a sign opposite to that of cost. Route data describing a route is provided to the motion planning system 305, which commands the vehicle controls 307 to implement the route or route extension, as described herein. The navigator system 313 can generate routes as described herein using a general purpose routing graph and routing graph modification data. Also, in examples where route data is received from a dispatch system, that route data can also be provided to the motion planning system 305.

The perception system 303 detects objects in the surrounding environment of the vehicle 300 based on sensor data, map data 326, and/or vehicle poses provided by the localizer system 330. For example, map data 326 used by the perception system describes roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 302 in comprehending and perceiving its surrounding environment and its relationship thereto.

In some examples, the perception system 303 determines state data for one or more of the objects in the surrounding environment of the vehicle 300. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 300; minimum path to interaction with the vehicle 300; minimum time duration to interaction with the vehicle 300; and/or other state information.

In some implementations, the perception system 303 determines state data for each object over a number of iterations. In particular, the perception system 303 updates the state data for each object at each iteration. Thus, the perception system 303 detects and tracks objects, such as other vehicles, that are proximate to the vehicle 300 over time.

The prediction system 304 is configured to predict one or more future positions for an object or objects in the environment surrounding the vehicle 300 (e.g., an object or objects detected by the perception system 303). The prediction system 304 generates prediction data associated with one or more of the objects detected by the perception system 303. In some examples, the prediction system 304 generates prediction data describing each of the respective objects detected by the prediction system 304.

Prediction data for an object is indicative of one or more predicted future locations of the object. For example, the prediction system 304 may predict where the object will be located within the next 5 seconds, 10 seconds, 100 seconds, etc. Prediction data for an object may indicate a predicted trajectory (e.g., predicted path) for the object within the surrounding environment of the vehicle 300. For example, the predicted trajectory (e.g., path) can indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the localizer system 330 and/or map data 326.

In some examples, the prediction system 304 uses state data indicative of an object type or classification to predict a trajectory for the object. As an example, the prediction system 304 can use state data provided by the perception system 303 to determine that a particular object (e.g., an object classified as a vehicle) approaching an intersection and maneuvering into a left-turn lane intends to turn left. In such a situation, the prediction system 304 predicts a trajectory (e.g., path) corresponding to a left-turn for the vehicle 300 such that the vehicle 300 turns left at the intersection. Similarly, the prediction system 304 determines predicted trajectories for other objects, such as bicycles, pedestrians, parked vehicles, etc. The prediction system 304 provides the predicted trajectories associated with the object(s) to the motion planning system 305.

In some implementations, the prediction system 304 is a goal-oriented prediction system 304 that generates one or more potential goals, selects one or more of the most likely potential goals, and develops one or more trajectories by which the object can achieve the one or more selected goals. For example, the prediction system 304 can include a scenario generation system that generates and/or scores the one or more goals for an object, and a scenario development system that determines the one or more trajectories by which the object can achieve the goals. In some implementations, the prediction system 304 can include a machine-learned goal-scoring model, a machine-learned trajectory development model, and/or other machine-learned models.

The motion planning system 305 commands the vehicle controls based at least in part on the predicted trajectories associated with the objects within the surrounding environment of the vehicle 300, the state data for the objects provided by the perception system 303, vehicle poses provided by the localizer system 330, map data 326, and route or route extension data provided by the navigator system 313. Stated differently, given information about the current locations of objects and/or predicted trajectories of objects within the surrounding environment of the vehicle 300, the motion planning system 305 determines control commands for the vehicle 300 that best navigate the vehicle 300 along the route or route extension relative to the objects at such locations and their predicted trajectories on acceptable roadways.

In some implementations, the motion planning system 305 can also evaluate one or more cost functions and/or one or more reward functions for each of one or more candidate control commands or sets of control commands for the vehicle 300. Thus, given information about the current locations and/or predicted future locations/trajectories of objects, the motion planning system 305 can determine a total cost (e.g., a sum of the cost(s) and/or reward(s) provided by the cost function(s) and/or reward function(s)) of adhering to a particular candidate control command or set of control commands. The motion planning system 305 can select or determine a control command or set of control commands for the vehicle 300 based at least in part on the cost function(s) and the reward function(s). For example, the motion plan that minimizes the total cost can be selected or otherwise determined.

In some implementations, the motion planning system 305 can be configured to iteratively update the route or route extension for the vehicle 300 as new sensor data is obtained from one or more sensors 301. For example, as new sensor data is obtained from one or more sensors 301, the sensor data can be analyzed by the perception system 303, the prediction system 304, and the motion planning system 305 to determine the motion plan.

The motion planning system 305 can provide control commands to one or more vehicle controls 307. For example, the one or more vehicle controls 307 can include throttle systems, brake systems, steering systems, and other control systems, each of which can include various vehicle controls (e.g., actuators or other devices that control gas flow, steering, braking) to control the motion of the vehicle 300. The various vehicle controls 307 can include one or more controllers, control devices, motors, and/or processors.

The vehicle controls 307 includes a brake control module 320. The brake control module 320 is configured to receive a braking command and bring about a response by applying (or not applying) the vehicle brakes. In some examples, the brake control module 320 includes a primary system and a secondary system. The primary system receives braking commands and, in response, brakes the vehicle 300. The secondary system may be configured to determine a failure of the primary system to brake the vehicle 300 in response to receiving the braking command.

A steering control system 332 is configured to receive a steering command and bring about a response in the steering mechanism of the vehicle 300. The steering command is provided to a steering system to provide a steering input to steer the vehicle 300.

A lighting/auxiliary control module 336 receives a lighting or auxiliary command. In response, the lighting/auxiliary control module 336 controls a lighting and/or auxiliary system of the vehicle 300. Controlling a lighting system may include, for example, turning on, turning off, or otherwise modulating headlines, parking lights, running lights, etc. Controlling an auxiliary system may include, for example, modulating windshield wipers, a defroster, etc.

A throttle control system 334 is configured to receive a throttle command and bring about a response in the engine speed or other throttle mechanism of the vehicle. For example, the throttle control system 334 can instruct an engine and/or engine controller, or other propulsion system component to control the engine or other propulsion system of the vehicle 300 to accelerate, decelerate, or remain at its current speed.

Each of the perception system 303, the prediction system 304, the motion planning system 305, the commander system 311, the navigator system 313, and the localizer system 330, can be included in or otherwise be a part of a vehicle autonomy system 302 configured to control the vehicle 300 based at least in part on data obtained from one or more sensors 301. For example, data obtained by one or more sensors 301 can be analyzed by each of the perception system 303, the prediction system 304, and the motion planning system 305 in a consecutive fashion in order to control the vehicle 300. While FIG. 3 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 302 includes one or more computing devices, which may implement all or parts of the perception system 303, the prediction system 304, the motion planning system 305 and/or the localizer system 330. Descriptions of hardware and software configurations for computing devices to implement the vehicle autonomy system 302 and/or the vehicle autonomy system 104 are provided herein at FIGS. 11 and 12.

Figure 4:
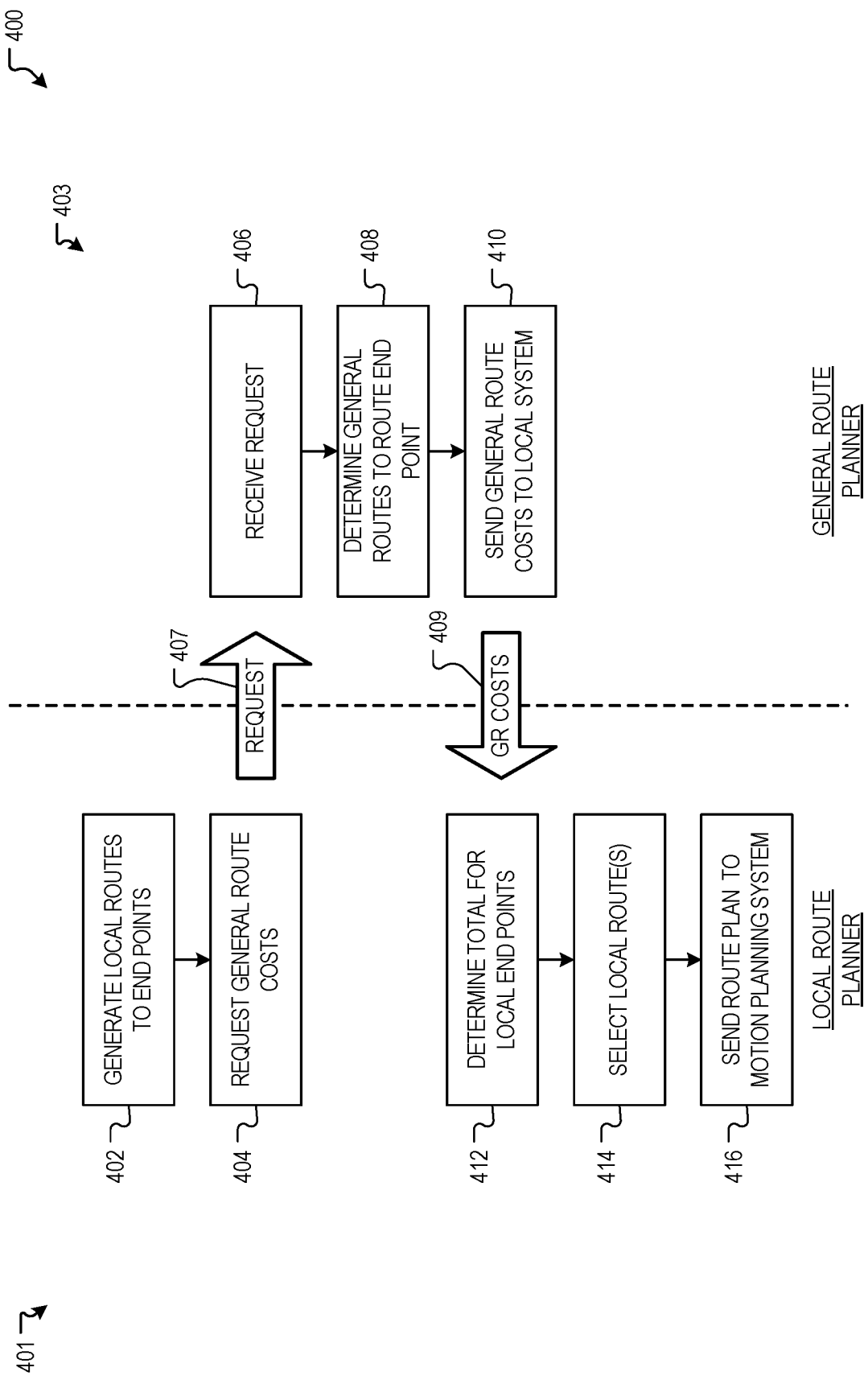
FIG. 4 is a flowchart showing one example of a process flow that can be executed by a local route planner and a general route planner to generate a route for an autonomous vehicle.

FIG. 4 is a flowchart showing one example of a process flow 400 that can be executed by a local route planner and a general route planner to generate a route for an autonomous vehicle. In some examples, the process flow 400 is executed by a local route planner and general route planner implemented onboard an autonomous vehicle, such as the local route planner 108 and general route planner 110 of the environment 100 of FIG. 1. In other examples, the process flow 400 is executed using an onboard local route planner 208 and remote general route planner 210A, as shown in FIG. 2. The process flow 400 includes two columns. A first column 401 includes operations executed by the local route planner. A second column 403 includes operations executed by the general route planner.

At operation 402, the local route planner generates local routes to local route endpoints. Any suitable method may be used to generate the local routes. In some examples, local routes are generated using a routing graph, for example, as described herein with respect to FIG. 5. In some examples, the local route planner generates local routes using a perceived map. A perceived map is a map generated from remote-detection sensor data. The local route planner can use the perceived map in conjunction with remote sensing data to generate as set of one or more local route endpoints. For example, the local route endpoints can be points from which the vehicle can leave the area detected by the remote detection sensors.

At operation 404, the local route planner requests general route costs, for example, by sending a general route cost request 407 to the general route planner. The general route planner receives the general route cost request at operation 406 and determines general routes at operation 408. General routes can be determined using a routing graph and path planning algorithm, for example, as described herein. At operation 410, the general route planner sends a general route cost reply 409 including general route costs to the local route planner.

The local route planner receives the general route costs and generates total costs for each of the local route endpoints at operation 412. At operation 414, the local route planner selects one or more local routes. The local route planner sends a route plan indicating the selected one or more local routes to a motion planning system at operation 416.

In some examples, the process flow 400 is executed periodically. For example, the process flow 400 can be executed at a time interval (e.g., every thirty seconds, every minute, every five minutes, etc.). Also, in some examples, the process flow 400 is executed when the vehicle comes with a threshold distance of the currently-selected local route endpoint. For example, if the currently-selected local route endpoint is at a particular roadway segment, the process flow 400 may be re-executed when the vehicle is within a threshold number of roadway segments (e.g., 3, 5, etc.) of the local route endpoint roadway segment.

FIG. 5 is a flowchart showing one example of a process flow 500 that can be executed by a local route planner, such as the local route planner 108 or the local route planner 208, to generate local routes. The process flow 500 shows a method based, at least in part, on expanding a routing graph or portion of a routing graph, such as the portion 150 of FIG. 1. The process flow 500 shows just one example way that the local route planner can generate local routes. Any suitable routing method can be used.

At operation 502, the local route planner begins at a start point graph element. The start point graph element may be a graph element corresponding to a roadway element where the vehicle will begin the route (e.g., the vehicle start point). At operation 504, the local route planner expands the current graph element to generate leaf graph elements. The leaf graph elements are graph elements which are reachable from the current graph element (e.g., graph elements that correspond to connected roadway elements). For example, the first time that the operation 504 is executed, leaf graph elements will include all graph elements that are reachable from the vehicle start point graph element. A leaf graph element is associated with a candidate local route from the vehicle start position graph element to the leaf graph element. The candidate local route is the set of roadway elements corresponding to the graph elements that were expanded to generate the leaf graph element. In some examples, expanding a current graph element includes removing the current graph element from a list of leaf graph elements, described herein.

At operation 506, the local route planner 108 determines if any of the leaf graph elements generated in the expansion of operation 504 are invalid. Invalid leaf graph elements are leaf graph elements corresponding to roadway elements that are not permitted to be part of a local route. Examples of invalid leaf graph elements are graph elements corresponding to roadway elements that a vehicle is not permitted to traverses (e.g., due to a policy routing graph modification, roadway condition etc.), graph elements that are at the edge of a routing graph, graph elements that are part of a loop, etc. In some examples, detecting invalid leaf graph elements can include detecting a loop in a local route. This can be done in any suitable manner. For example, if a graph element is part of its own path from the vehicle start point, then the graph element may not be a valid leaf graph element and may be removed from the graph element list. In some examples, instead of removing invalid leaf graph elements from the leaf graph element list at operation 506, the local route planner 108 can refrain from placing invalid leaf graph elements on the list when expanding the current graph element at operation 504. If a leaf graph element is invalid, it may be discarded at operation 508.

At operation 510, the local route planner determines if any leaf graph elements resulting from the expansion of the current graph element at operation 504 meet a set of one or more termination parameters. Termination parameters are conditions indicating an end of a local route. One example termination parameter is met if the leaf graph element is more than a threshold distance from the vehicle position graph element. The distance can be measured in distance traveled and/or number of graph elements. Another example termination parameter is met if the path associated with a leaf graph element includes more than a threshold number of direction changes. A direction change can occur if the path proceeds from one graph element to another that is not directly in front of the first graph element. Another example termination parameter is met if a leaf graph element is at the edge of a routing graph used by the local route planner. Another example termination parameter is met if a leaf graph element is at the edge of a routing graph or map used by the local route planner, such as a perceived map. Yet another example termination parameter is met if the leaf graph element is a dead end (e.g., if the leaf graph element corresponds to the end of a roadway and/or if the leaf graph element has no further connections other than returning to the previous leaf graph element). In some examples, a termination parameter can be set by a policy or constraint. For example, the local route planner may terminate a local route if it includes more than a threshold number of graph elements, if the sum of the costs of the graph elements on a local route exceeds a threshold, etc.

The set of termination parameters applied at operation 510 can include one termination parameter or more than one termination parameter. If more than one termination parameter is applied, the more than one termination parameter can be applied conjunctively or disjunctively. If a set of multiple termination parameters are applied disjunctively, then the leaf graph element meets the set of multiple termination parameters if it meets any one parameter. If the set of multiple termination parameters is applied conjunctively, then the leaf graph element meets the set of multiple termination parameters if it meets more than one of the termination parameters (e.g., any two termination parameters, all termination parameters, a majority of termination parameters, etc.)

If any leaf graph element resulting from the expansion of the current graph element at operation 504 meets the one or more termination parameters, then that leaf graph element is set as a local route endpoint and the candidate local route associated with that leaf graph element is set as the corresponding local route at operation 512. Any valid leaf graph elements resulting from the expansion at operation 504 that do not meet termination parameters are written to the leaf graph element list at operation 514. Each entry on the leaf graph element list can include, for example, the leaf graph element and its associated candidate local route. Loops can be detected at operation 512 before a local route is generated. For example, if the candidate local route associated with the leaf graph element meeting the termination parameters includes a loop, the candidate local route may not become a local route and the corresponding leaf graph element may be discarded.

At operation 516, the local route planner determines if there are additional leaf graph elements on the leaf graph element list at operation 516. If no, the process flow may conclude at operation 520. If there are leaf graph elements left on the left graph element list, the local route planner may select a next leaf graph element from the list at operation 518 and expand that leaf graph element at operation 504. Upon executing the process flow 500, the local route planner 108 may have a set of local routes and local route endpoints. The local route planner 108 may use the local route endpoints, as described herein, to request general route costs.

To further illustrate the process flow 500, consider an example in which the vehicle position is at a graph element A. In this example, the graph element A is expandable to graph elements B, C, and D. Also, in this example, graph element B meets the termination parameters and graph element C is invalid. Accordingly, at operation 504, the graph element A is expanded to generate leaf node graph elements B, C, and D. Because graph element C is invalid, it is discarded at operation 508, leaving leaf graph elements B and D. Because graph element B meets the termination parameters, it is set, at operation 512, to be a local route endpoint. The candidate local route associated with graph element B (e.g., A→B) is set as a local route. At operation 514, the graph element D is written to the remaining leaf list at operation 514 along with its candidate local route (e.g., A→D). Leaf graph element D becomes the current graph element at operation 518 and is expanded at operation 504. The process may continue until all leaf graph elements either become local route endpoints or are invalid.

Figure 6:
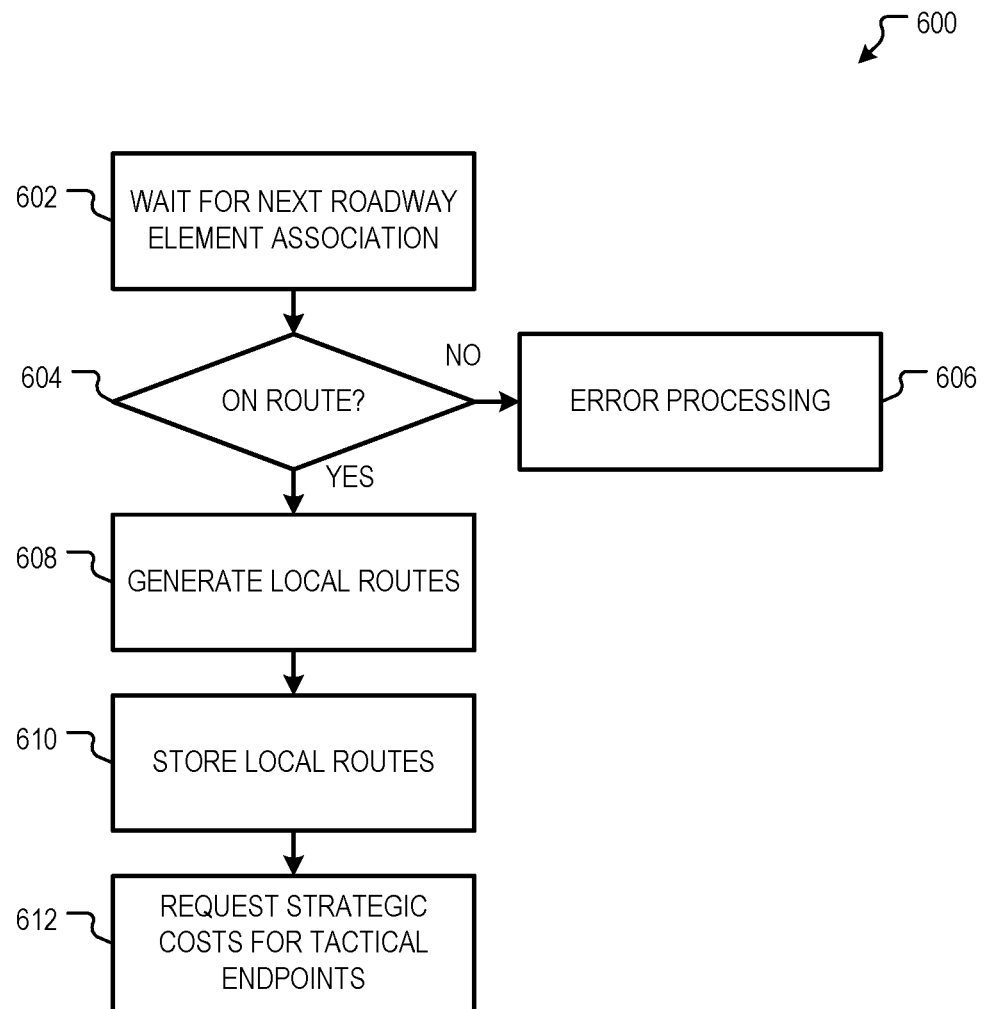
FIG. 6 is a flowchart showing one example of a process flow that may be executed by the local route planner to generate local routes and request general route costs.

FIG. 6 is a flowchart showing one example of a process flow 600 that may be executed by the local route planner (such as the local route planner 108 or the local route planner 208) to generate local routes and request general route costs. At operation 602, the local route planner waits for a next roadway element association. The next roadway element association may be a roadway element in which the vehicle is currently present. For example, the next roadway element association can be received from a localizer or other suitable component for localizing the vehicle. At optional operation 604, the local route planner 108 may determine whether it is on the current route. If not, the local route planner 108 can perform error processing at operation 606. Error processing can include, for example, executing a route generation routine, prompting a human user to indicate that the vehicle is off course, disengaging the vehicle autonomy system, etc.

If the vehicle is on the route, or if operations 604 and 606 are omitted, the local route planner generates local routes at operation 608. Local routes can be generated in any suitable way including, for example, as described with respect to the process flow 500 of FIG. 5. Local routes generated at operation 608 are stored at operation 610. Stored local routes can include, for example, a path of the local route including a set of connected roadway elements and a local route endpoint. In some examples, a stored local route also includes an indication of the cost of the local route (e.g., a sum of the costs to traverse and/or traverse between roadway elements of the local route). In some examples, the local route planner or other suitable component can produce a graphical representation of the remote routes that can be provided to a user, for example, in the vehicle or at the dispatch system.

At operation 612, the local route planner requests general costs for the determined local routes. The request can be directed to an onboard general route planner, such as the general route planners 110, 210B and/or to a remote general route planner, such as the general route planner 210A. In some examples, the request generated by the local route planner does not specify whether it is directed to an onboard general route planner or a remote general route planner. For example, the vehicle autonomy system of the vehicle, in some examples, receives the request and directs it to an onboard or remote general route planner, as appropriate.

Figure 7:
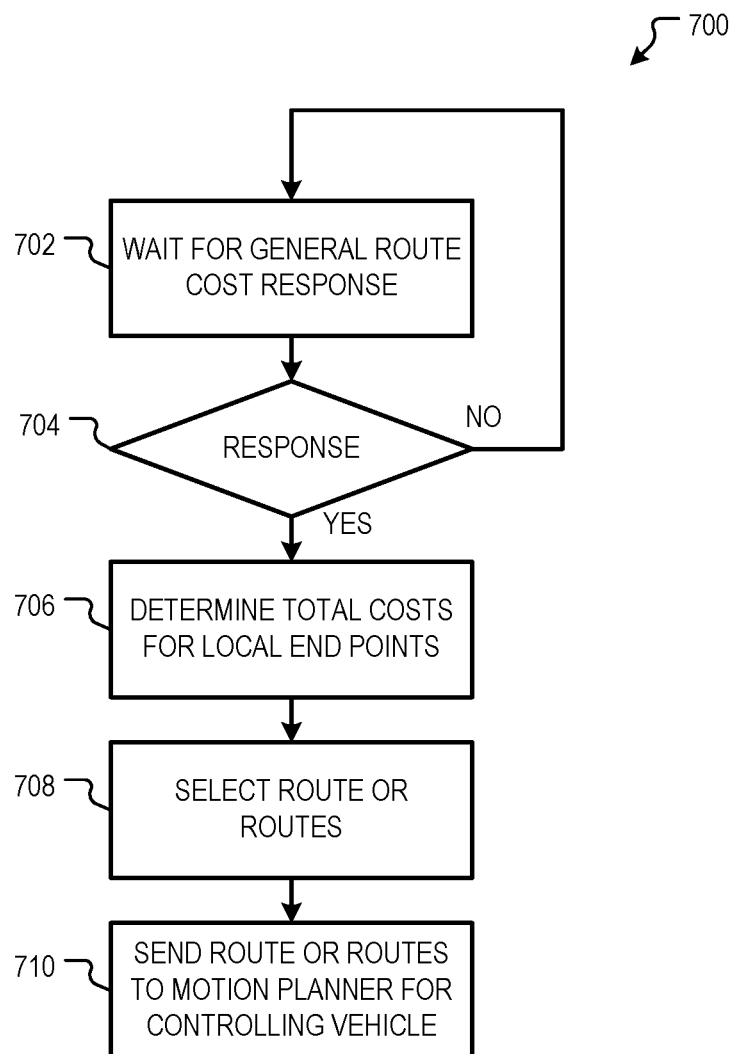
FIG. 7 is a flowchart showing one example of a process flow that can be executed by a local route planner after sending a general route cost request.

FIG. 7 is a flowchart showing one example of a process flow 700 that can be executed by a local route planner, such as the local route planners 108, 208, after sending a general route cost request. For example, the local route planner can execute the process flow 700 after executing the process flow 600 of FIG. 6.

At operation 702, the local route planner waits for a general route cost response. If the response is not received at operation 704, the local route planner returns to operation 702. In some examples, the local route planner may "time out" if no response is received within a predetermined time. If the local route planner times out, it may, for example, re-send the request to the general route planner and/or enter an error state. When the response is received at operation 704, the local route planner determines total costs for some or all of the local route endpoints. This can include, for some or all of the local routes, adding the cost of the local route to the general route cost associated with that local route. At operation 708, the local route planner selects one or more routes based on the total costs determined at operation 706. For example, the lowest cost route or routes may be selected. At operation 710, the local route or routes determined at operation 708 are provided to the motion planning system for controlling the vehicle.

Figure 8:
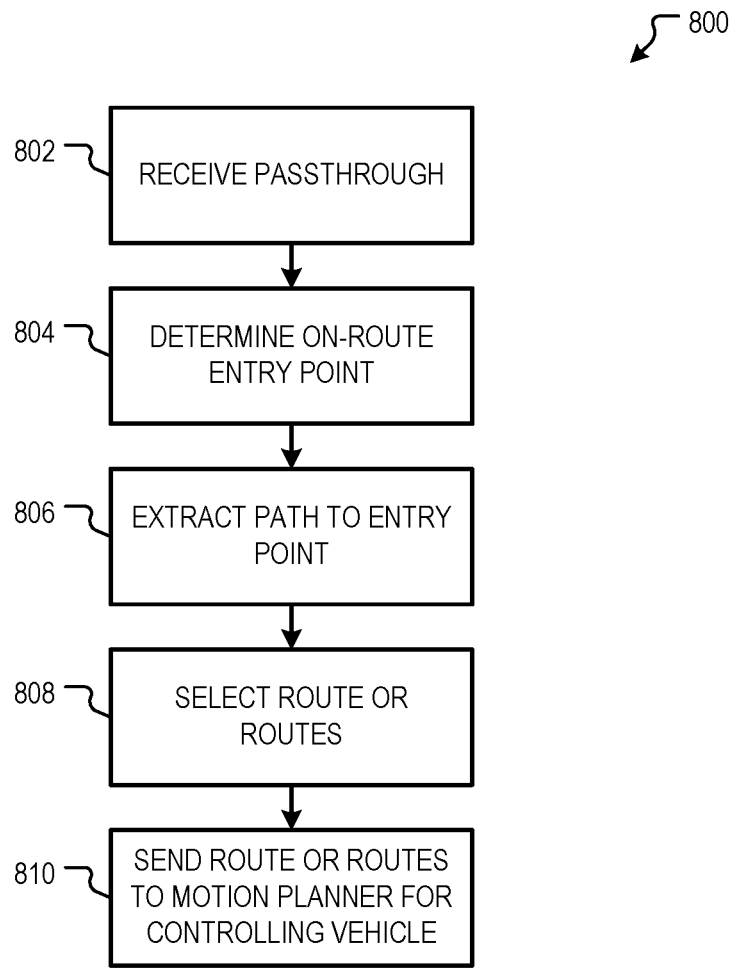
FIG. 8 is a flowchart showing one example of a process flow that can be executed by a local route planner to execute a passthrough route.

FIG. 8 is a flowchart showing one example of a process flow 800 that can be executed by a local route planner, such as the local route planners 108, 208, to execute a passthrough route. A passthrough route is a route that traverses a particular string of roadway elements, for example, without deviation unless required by safety or road conditions.

At operation 802, the local route planner receives the passthrough route. The passthrough route can include a path of connected roadway elements to be traversed. At operation 804, the local route planner determines an on-route entry point. The on-route entry point is a point (e.g., a roadway element) at which the vehicle can begin to execute the passthrough route. At operation 806, the local route planner 108 determines one or more routes to the entry point, for example, as described with respect to FIG. 5. In some examples, the on-route entry point is determined by the local route planner at operation 806. For example, the termination parameter for generating the local route or routes may be met when the end of the local route or routes is a roadway element that is part of the passthrough route. The roadway element of the passthrough route that is reached first during the local routing process may be the entry point. In some examples, different local routes have different entry points. At operation 808, the local route planner 108 selects one or more of the routes determined at operation 806. The selected route or routes are provided to the motion planner as a route plan at operation 810.

Figure 9:
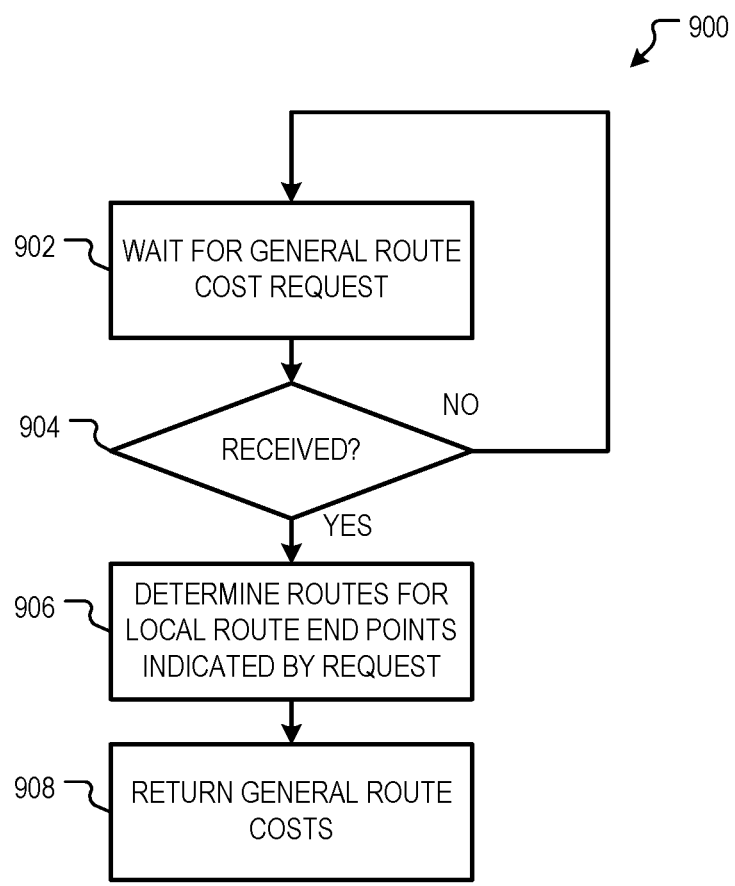
FIG. 9 is a flowchart showing one example of a process flow that can be executed by a general route planner.

FIG. 9 is a flowchart showing one example of a process flow 900 that can be executed by a general route planner, such as by onboard general route planner 108, 208B or remote general route planner 208A. At operation 902, the general route planner waits for a general route cost request. If a request is not received at operation 904, the general route planner continues to wait at operation 902. When a request is received at operation 906, the general route planner determines general routes for local route endpoints indicated by the request. The general routes may be determined in any suitable way. For example, the general routes can be determined utilizing a routing graph and path planning algorithm, as described herein. In some examples, the general routes are determined utilizing transient constraints that change the cost and/or connectivity of routing graph based on transient phenomena such as, for example, weather, traffic, etc. At operation 908, the general route planner 110 returns general route costs for the received local route endpoints. The general route costs can include, for example the costs of the general route corresponding to each associated local route endpoint.

Figure 10:
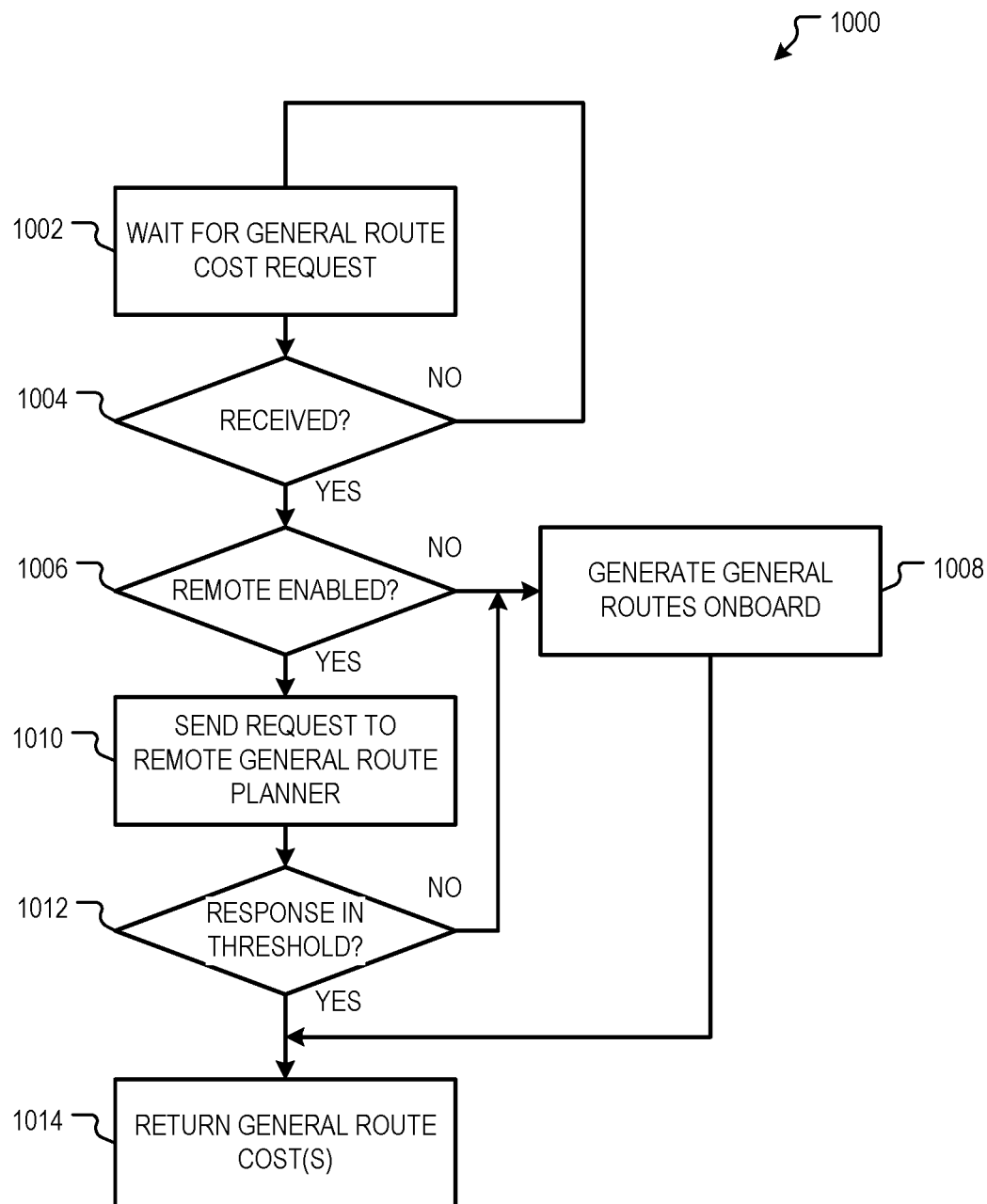
FIG. 10 is a flowchart showing one example of a process flow that can be executed by an onboard general route planner to respond to a general route cost request from a local route planner.

FIG. 10 is a flowchart showing one example of a process flow 1000 that can be executed by an onboard general route planner, such as the onboard general route planner 208B, to respond to a general route cost request from a local route planner. At operation 1002, the onboard general route planner waits for a general route cost request. If a request is not received at operation 1004, the onboard general route planner continues to wait at operation 1002.

When a request is received, the onboard general route planner determines, at operation 1006, whether a remote general route planner is enabled. If the remote general route planner is not enabled, the onboard general route planner determines general routes and associated costs at operation 1008, for example, as described herein.

If the remote general route planner is enabled, the onboard general route planner sends a general route cost request to the remote general route planner at operation 1010. At operation 1012, the onboard general route planner determines if a response to the request at 1010 was received within a threshold time. If a response is not received, the onboard general route planner determines general routes and associated costs at operation 1008, for example, as described herein. If a response is received within the threshold time period or after generating the general routes and associated costs, the onboard general route planner returns general route costs at operation 1014. In the example of FIG. 10, the onboard general route planner is configured to act as a fallback or backup by generating general routes at operation 1008, for example, if a remote general route planner is not enabled (operation 1006) or fails to respond in time (operation 1012).

Figure 11:
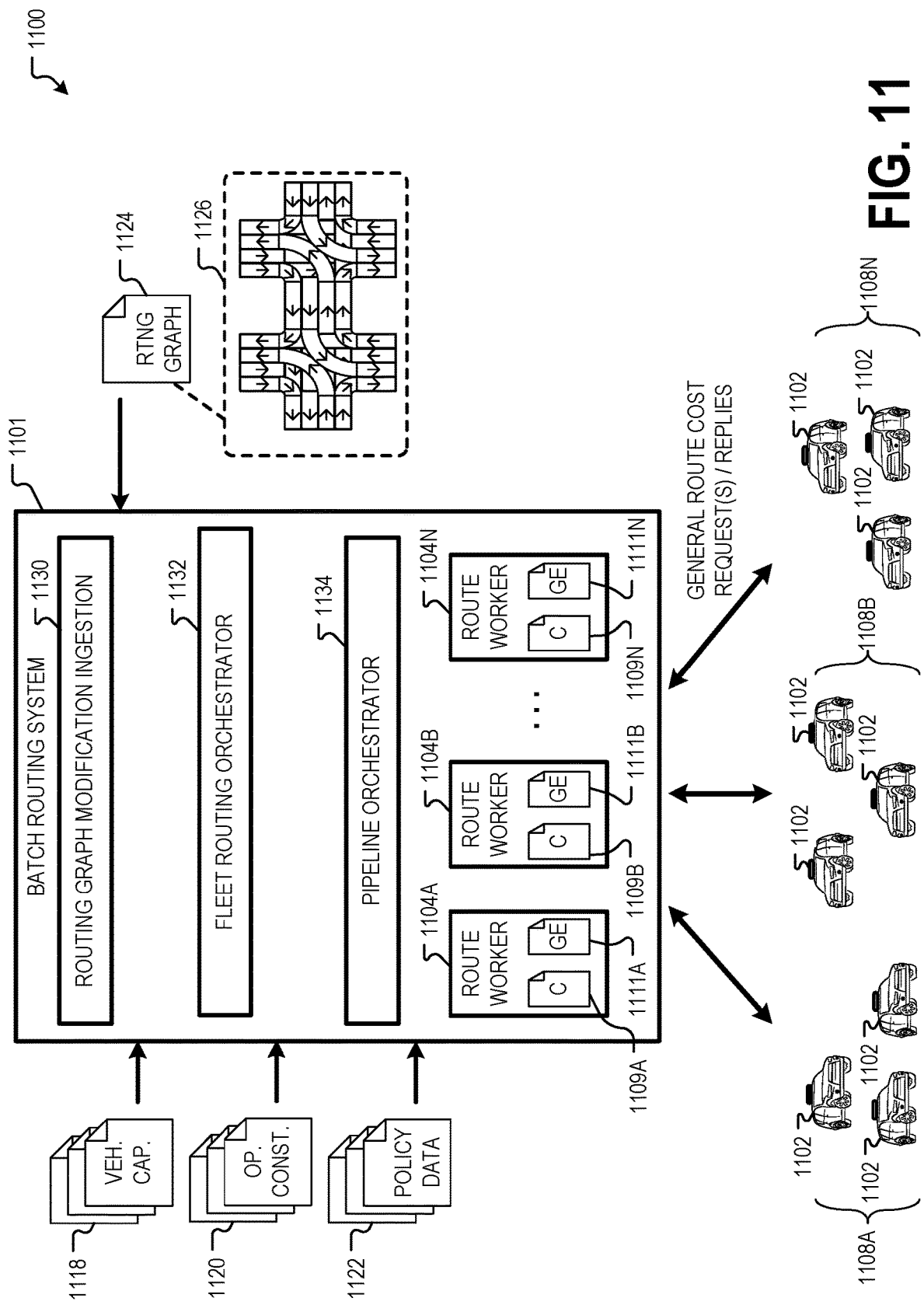
FIG. 11 is a diagram showing one example of an environment including a batch routing system and a number of autonomous vehicles.

FIG. 11 is a diagram showing one example of an environment 1100 including a batch routing system 1101 and a number of autonomous vehicles 1102. The batch routing system 1101 acts as a remote general route planner to the autonomous vehicles 1102, for example, similar to the remote generate route planner 210A of FIG. 2. For example, one or more of the autonomous vehicles 1102 may direct general route cost requests to batch routing system 1101. The batch routing system 1101 may reply by returning general route costs, as described herein.

The environment 1100 shows vehicles 1102 of three different vehicle types 1108A, 1108B, 1108N. Although three different vehicle types 1108A, 1108B, 1108N are shown in FIG. 11, the batch routing system 1101 can be configured to provide general route costing to dispatch trips to more or fewer different vehicle types.

In some examples, the different types 1108A, 1108B, 1108N of vehicles 1102 have different capabilities. For example, different types 1108A, 1108B, 1108N of vehicles 1102 can have different vehicle autonomy systems. This can include, for example, vehicle autonomy systems created by different manufacturers or designers, vehicle autonomy systems having different software versions or revisions, etc. Also, in some examples, different types 1108A, 1108B, 1108N of vehicles 102 can have different remote sensor sets. For example, one type 1108A of vehicles 1102 may include a LIDAR remote sensor while another type 1108N of vehicle 1102 may include stereoscopic cameras and omit a LIDAR remote sensor. In some examples, different types 1108A, 1108B, 1108N of vehicles 1102 can also have different mechanical particulars. For example, one type 1108A of vehicle may have all-wheel drive while another type 1108B may have front-wheel drive.

Because of their differences, different types 1108A, 1108B, 1108N of vehicles 1102 may be routed differently. For example, different types 1108A, 1108B, 1108N of vehicles 1102 may have different routing constraints describing the roadway elements that the vehicles are capable of traversing and/or affecting the cost of traversing the roadway element. Accordingly, the batch routing system 1101 may generate general route costs for different types 1108A, 1108B, 1108N of vehicles 1102 differently.

The batch routing system 1101 may generate general route costs for the vehicles 1102 by applying constraints to a routing graph to generate a constrained routing graph. Vehicles of different types 1108A, 1108B, 1108N may be associated with different constraints. Accordingly, the batch routing system 1101 may generate different constrained routing graphs for different vehicle types 1108A, 1108B, 1108N. Constraints may be based on routing graph modification data, such as vehicle capability data 1118, operational data 1120, and/or policy data 1122. For example, routing graph modification data may be applied to one or more routing graphs 1124 to generate constrained routing graphs, as described herein. In FIG. 11, break-out window 1126 shows example graph elements making up part of the routing graph 1124. Graph elements in the break-out window 1126 are illustrated as shapes with arrows indicating the directionality of the graph elements. Graph elements can be connected to one another at the routing graph 1124, for example, according to directionality.

The routing graph modification data, including vehicle capability data 1118, operational data 1120, and policy data 1122, indicates the constraints that are applied to a routing graph 1124 to generate the constrained routing graphs, as described herein. Generally, a routing graph modification described by routing graph modification data includes a graph element descriptor or set of graph element descriptors describing graph elements subject to the routing graph modification and one or more constraints to be applied to the described graph elements. Constraints can include, for example, removing graph elements having the indicated property or properties from the routing graph, removing graph element connections to graph elements having the indicated property or properties from the routing graph. Another example routing graph modification can include changing a cost associated with graph element (e.g., a graph element cost) and/or transitions to the graph element.

Costs may be changed up or down. For example, if routing graph modification data indicates that graph elements having a particular property or set of properties are disfavored, the costs to traverse and/or transition to the graph elements can be increased. On the other hand, if routing graph modification data indicates that graph elements having a particular constraint property or set of constraint properties are favored, the costs to traverse and/or transition to the graph elements can be decreased.

Routing graph modifications can relate to graph elements that have the indicated constraint property or properties. For example, if a routing graph modification is to forbid routing a vehicle through graph elements that correspond to a school zone, a corresponding routing graph modification includes removing such school zone graph elements from the routing graph 1124 and/or removing transitions to such school zone graph elements. Routing graph modifications can, in some examples, describe changes to graph elements other than those having the identified properties. Consider an example routing graph modification that is to avoid cul-de-sacs. The associated constraint could involve removing graph elements that correspond to cul-de-sacs and also removing graph elements that do not correspond to cul-de-sacs but can lead only to other graph elements that correspond to cul-de-sacs.

Vehicle capability data 1118 describes routing graph modifications associated with various autonomous vehicles 102 of different types 108A, 108B, 108N. For example, the vehicle capability data 118 can be and/or be derived from Operational Domain (OD) or Operational Design Domain (ODD) data, if any, provided by the vehicle's manufacturer. Routing graph modifications described by vehicle capability data 1118 can include graph element descriptor data identifying a graph element property or properties (e.g., includes an unprotected left, is part of a controlled access highway, etc.) and constraints indicating what is to be done to graph elements having the indicated property or properties. For example, graph elements corresponding to roadway elements that a particular vehicle type 1108A, 1108B, 1108N is not capable of traversing can be removed from the routing graph or can have connectivity data modified to remove transitions to those graph elements. For example, the batch routing system 1101 can remove one or more connections to the graph element. If the graph element descriptor data indicates a maneuver that is undesirable for a vehicle, but not forbidden, then the constraint can call for increasing the cost of an identified graph element or transitions thereto.

Operational data 120 describes operational routing graph modifications. Operational routing graph modifications can be based, for example, on the state of one or more roadways. For example, if a roadway is to be closed for a parade or for construction, an operational routing graph modifications comprises graph element descriptor data that identifies graph elements corresponding to roadway elements that are part of the closure and an associated constraint (e.g., removing the graph element, removing transitions to the graph elements, etc.).

Policy data 1122 can describe policy constraints. Policy routing graph modifications include graph element descriptors that identify graph elements corresponding to roadway elements that are subject to a policy routing graph modification and corresponding routing graph modifications. Policy routing graph modifications refer to types of route segments that it is desirable for a vehicle to avoid or prioritize. An example policy routing graph modification is to avoid roadway elements that are in or pass through school zones. Another example policy routing graph modification is to avoid routing vehicles in residential neighborhoods. Yet another example policy routing graph modification is to favor routing vehicles on controlled-access highways, if available. Policy routing graph modifications can apply to some vehicles, some vehicle types, all vehicles, or all vehicle types.

The batch routing system 1101 is configured to ingest the routing graph modification data 1118, 1120, 1122 and generate general route costs requested by the vehicles 1102 in view of the routing graph modification data 1118, 1120, 1122. A routing graph modification ingestion subsystem 1130 receives the routing graph modification data 1118, 1120, 1122 and prepares the routing graph modification data 1118, 1120, 1122 for use in routing. For example, the routing graph modification ingestion subsystem 1130 may receive and format routing graph modification data 1118, 1120, 1122. In some examples, this includes formatting the routing graph modification data 1118, 1120, 1122 to include a graph element descriptor or descriptors. In some examples, it may include generating metadata associating particular routing graph modifications with particular vehicles 1102 or vehicle types 1108A, 1108B, 1108N.

The batch routing system 1101 may also include a fleet routing orchestrator 1132. The fleet routing orchestrator 1132 manages the provision of constraints described by the routing graph modification data 1118, 1120, 1122 to vehicles 1102 and/or route workers 1104A, 1104B, 1104N as described herein. For example, the fleet routing orchestrator 1132 may categorize or otherwise organize constraints from the routing graph modification data 1118, 1120, 1122 according to the vehicle type 1108A, 1108B, 1108N to which the constraints apply.

In some examples, general routes and general route costs for the vehicles 1102 are generated by one or more route workers 1104A, 1104B, 1104N. Route workers 1104A, 1104B, 1104N are programs that can be initiated and stopped, for example, as needed. In some examples, route workers 1104A, 1104B, 1104N are configured to operate in parallel. For example, as one route worker 1104A generates general route costs for one vehicle 1102 another route worker 1104B generates general route costs for another vehicle 1102. A pipeline orchestrator 1134 manages the operation of the route workers 1104A. For example, the pipeline orchestrator may be configured to initiate and/or stop route workers 1104A, 1104B, 1104N, for example, based on demand.

Route workers 1104A, 1104B, 1104N can utilize constrained routing graphs 1109A, 1109B, 1109N. Constrained routing graphs 1109A, 1109B, 1109N can be generated by the route workers 1104A, 1104B, 1104N and/or by another component, such as the fleet routing orchestrator. Different route workers 1104A, 1104B, 1104N may use different constrained routing graphs 1109A, 1109B, 1109N. For example, different route workers 1104A, 1104B, 1104N may use constrained routing graphs 1109A, 1109B, 1109N generated from different routing graphs 1124, different portions of the routing graph 1124, and/or using different sets of constraints derived from the routing graph modification data 1118, 1120, 1122. For example, the fleet routing orchestrator 1132 and/or pipeline orchestrator 1134 may provide a route worker 1104A, 1104B, 1104N with a constrained routing graph 1109A, 1109B, 1109N and/or with a set of constraints particular to the vehicle 1102 that the route worker 1104A, 1104B, 1104N will service.

Route workers 1104A, 1104B, 1104N may generate general routes, as described herein, by applying a path planning algorithm to the respective constrained routing graphs 1109A, 1109B, 1109N. For generating any given route, this may generate graph expansion data 1111A, 1111B, 1111N. Graph expansion data 1111A, 1111B, 1111N can be generated from expanding the constrained routing graph 1109A, 1109B, 1109N to generate potential connections between graph elements that can be used as a route. When one or more sets of potential connections of the graph expansion data 1111A, 1111B, 1111N span between a route start point and a route endpoint, the graph expansion data 1111A, 1111B, 1111N is used to find the set of potential connections with the lowest cost, which is the determined route.

Route workers 1104A, 1104B, 1104N can apply a path planning algorithm forwards or backwards. When a path planning algorithm is applied forwards, the route workers 1104A, 1104B, 1104N begin generating graph expansion data 1111A, 1111B, 1111N at one of the local route endpoints and continue expanding the respective routing graph 1109A, 1109B, 1109N until the expansion includes the trip endpoint. In other examples, the route workers 1104A, 1104B, 1104N apply a path planning algorithm backwards. When a path planning algorithm is applied backwards, the route workers 1104A, 1104B, 1104N begin generating graph expansion data 1111A, 1111B, 1111N at the trip endpoint and continue expanding the respective routing graph 1109A, 1109B, 1109N until the expansion includes the trip start point (here, for example, one or more of the local route endpoints).

In some examples, route workers 1104A, 1104B, 1104N apply path planning algorithms backwards. In this way, a route worker 1104A, 1104B, 1104N can cache graph expansion data 1111A, 1111B, 1111N resulting from the generation of one general route for a vehicle 1102 and re-use the cached graph expansion data 1111A, 1111B, 1111N to find subsequent general routes for the same vehicle 1102.

In some examples, the pipeline orchestrator 1134 or other suitable component of the batch routing system 1101 may take advantage of cached graph expansion data 1111A, 1111B, 1111N by re-assigning general route cost requests for the same vehicle 1102 to the same route worker 1104A, 1104B, 1104N. For example, as described herein, a vehicle 1102 may make repeated general route cost requests as it traverses to a trip endpoint. Because the trip endpoint may not change, the same graph expansion data 1111A, 1111B, 1111N can be re-used. Accordingly, general route cost requests from the same vehicle, in some examples, are routed to the same route worker 1104A, 1104B, 1104N which can re-use cached graph expansion data 1111A, 1111B, 1111N to expedite processing.

In some examples, cached graph expansion data 1111A, 1111B, 1111N can also be exploited for different vehicles 1102 traveling to the same trip endpoint and/or trip endpoints that are near one another. For example, the batch routing system 1101, upon receiving a general route cost request from a vehicle 1102, may determine if any route workers 1104A, 1104B, 1104N are utilizing the constrained routing graph 1109A, 1109B, 1109N for the vehicle 1102 and have previously handled a request from another vehicle 1102 having a trip endpoint within a threshold distance of the trip endpoint of the current vehicle 1102. If such a route worker 1104A, 1104B, 1104N exists, the current general route cost request may be assigned to that route worker 1104A, 1104B, 1104N.

Figure 12:
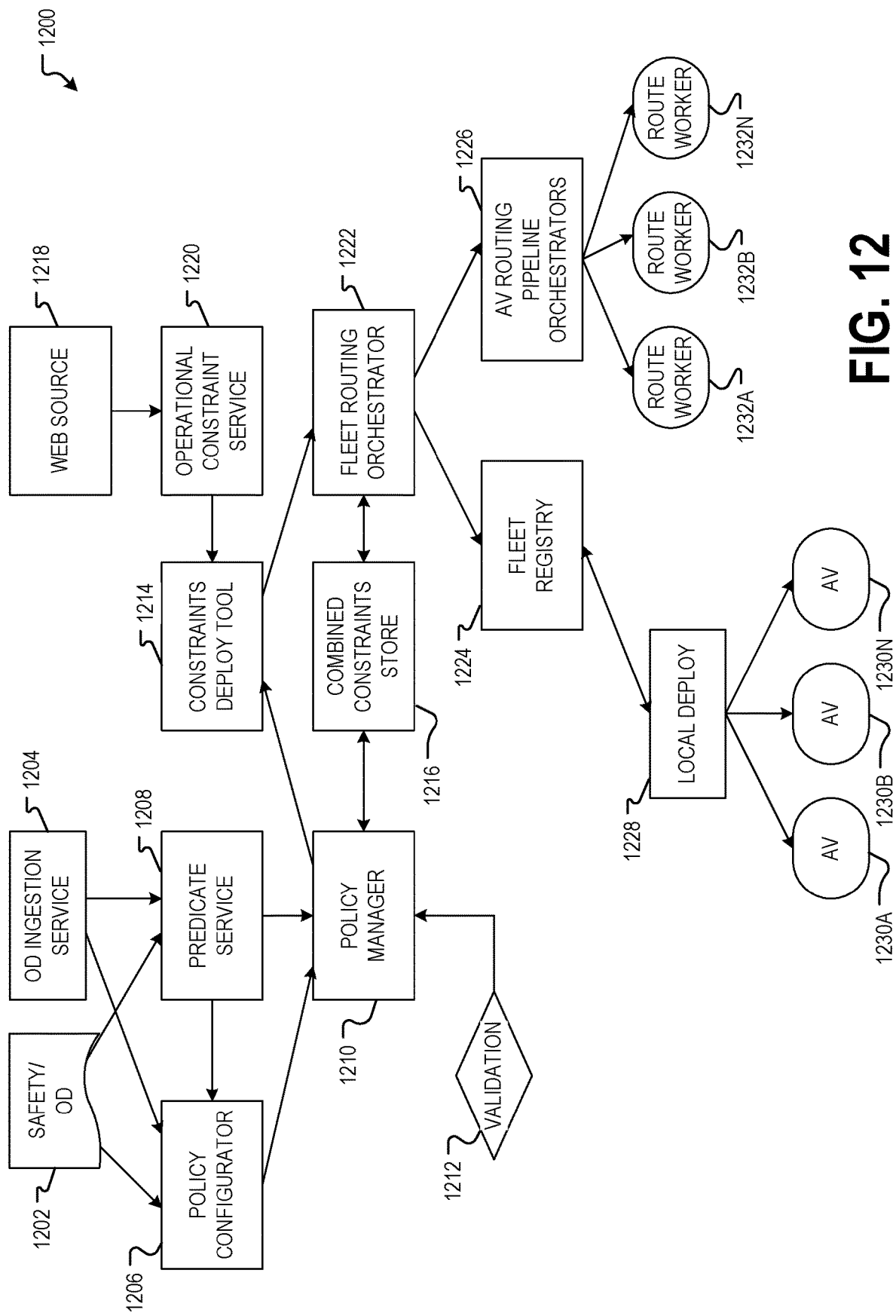
FIG. 12 is a diagram showing another example configuration of a batch routing system.

FIG. 12 is a diagram showing another example configuration of a batch routing system 1200. The batch routing system comprises a safety OD component 1202 and OD ingestion service 1204 that are configured to receive and process vehicle capability data. For example, the OD ingestion service 1204 receives and formats vehicle capability data, for example, from vehicle manufacturers. The safety OD component 1202 may receive policies, for example, from a user and/or as packaged data. For example, a manufacturer may provide one or more policies that are specific to a particular type of vehicle. In some examples, the safety/OD component can also receive from other sources, such as, for example, from a proprietor of the batch routing system 1200, etc.

Some vehicle capability data and policy data may be received in a form that includes formatted routing graph modifications ready to be applied to a routing graph. These routing graph modifications can be provided to the constraints deploy tool 1214 described herein. A policy configurator component 1206 converts OD data and policy data into constraints that can be applied to a routing graph, as described herein. For example, the policy configurator component 1206 can receive data that is not yet ready for provision to the constraints deploy tool 1214. A predicate service 1208 may work in conjunction with the policy configurator component 1202 to generate routing graph modifications. For example, the predicate service 1208 can determine, for a routing graph modification, the graph element descriptor or descriptors that should be true in order to apply the corresponding constraint.

Routing graph modification data generated by the policy configurator 1206 and/or the predicate service 1208 is provided to a policy manager 1210. The policy manager 1210 may work in conjunction with a validation tool 1212 to validate routing graph modifications. For example, the validation tool 1212 may be configured to verify that a routing graph modification is logically and syntactically correct. In some examples, the validation tool 1212 is also configured to cryptographically sign a constraint. The policy manager 1210 provides validated routing graph modifications to a constraints deploy tool 1214 and, in some examples, to a combined constraints store 1216 where the routing graph modifications may be stored.

The constraints deploy tool 1214, in some examples, receives other routing graph modifications, such as operational routing graph modifications from an operational constraint service 1220. Operational routing graph modifications can include, for example, routing graph modifications related to traffic, weather, or other temporal roadway conditions. In some examples, operational routing graph modifications are received from a web source, such as a traffic service, a weather service, etc. The operational constraint service 1220 converts operational data from one or more web sources 1218 into routing graph modifications that are provided to the constraints deploy tool 1214. In some examples, utilizing general and local routes, as described herein, may provide advantages including increased or streamlined consideration of operational routing graph modifications. For example, operational, and other temporary or changing routing graph modifications, may not need to be pushed to individual AVs 1230A, 1230B, 1230N as often as if the AVs 1230A, 1230B, 1230N were doing all routing on-board or, in some examples, may not be pushed to individual AVs 1230A, 1230B, 1230N at all.

The constraints deploy tool 1214 manages routing graph modifications received from the various other components and provides those constraints to the fleet routing orchestrator 1222. The fleet routing orchestrator 1222 manages routing graph constraints by vehicle type and provides the routing graph modifications to a fleet registry tool 1224 and/or to an AV routing pipeline orchestrator 1226. The AV routing pipeline orchestrator 1226 manages one or more route workers 1232A, 1232B, 1232N. For example, the AV routing pipeline orchestrator 1226 starts route workers 1232A, 1232B, 1232N and stops route workers 1232A, 1232B, 1232N based on load and may provide route workers 1232A, 1232B, 1232N with constraints and/or a constrained routing graph based on the vehicle to be serviced.

The constraints deploy tool 1214, in some examples, also provides routing graph modifications to a fleet registry tool 1224. The fleet registry tool 1224 provides the routing graph modifications to a local deploy tool 1228 in communication with various autonomous vehicles 1230A, 1230B, 1230N. The fleet registry tool 1224 may provide routing graph modifications to the vehicles 1230A, 1230B, 1230N, for example, when the vehicles 1230A, 1230B, 1230N are available for communication. This can occur, for example, when the vehicles 1230A, 1230B, 1230N are in remote communication with the local deploy tool 1228 and/or when the vehicles 1230A, 1230B, 1230N are, for example, at a tender or other location where wired communication is available. Vehicles 1230A, 1230B, 1230N can use the routing graph modifications, in some examples, to generate local routes as described herein.

Figure 13:
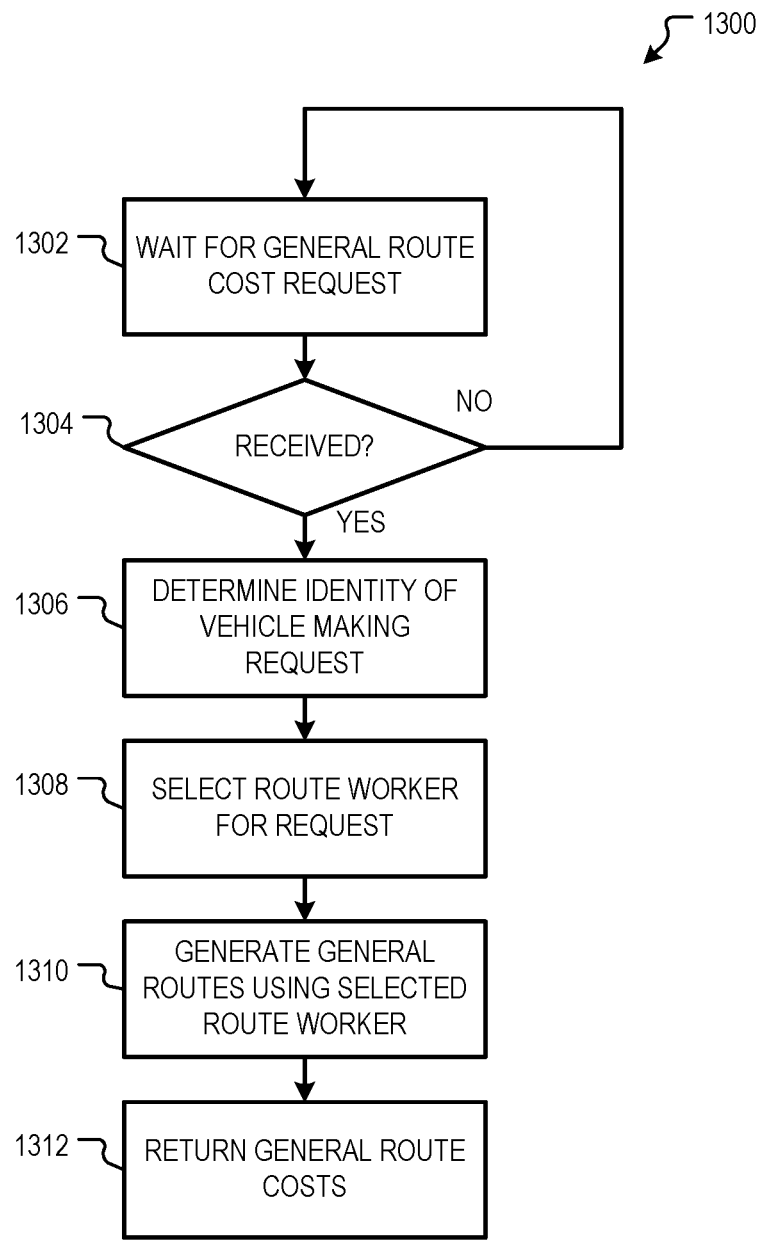
FIG. 13 is a flowchart showing one example of a process flow that can be executed by a batch routing system to respond to a general route request from a vehicle.

FIG. 13 is a flowchart showing one example of a process flow 1300 that can be executed by a batch routing system, such as the batch routing system 1101 or the batch routing system 1200 to respond to a general route request from a vehicle. At operation 1302, the batch routing system waits for a general route cost request. If a request is not received at operation 1304, the batch routing system continues to wait at operation 1302. When a request is received at operation 1306, the batch routing system determines the identity of the vehicle making the request. For example, the general route cost request can include data identifying the type of the vehicle. The type 1108A, 1108B, 1108N can be identified directly or indirectly. For example, the general route cost request can include an identifier of the vehicle that the batch routing system can correlate to a corresponding vehicle type.

At operation 1308, the batch routing system selects a route worker to handle the general route cost request. The route worker may be selected in any suitable manner using any suitable criteria. The batch routing system may select a route worker that has generated or been provided with a constrained routing graph that reflects constraints specific to the requesting vehicle and covers the geographic area in which the vehicle is traveling. In some examples, the batch routing system selects a route worker that has handled a previous general request cost from the same vehicle. Such a route worker, as described herein, may have cached graph expansion data that can be re-used to streamline the process of generating and costing general routes. In some examples, the batch processing system determines if the trip endpoint associated with the general route cost request is within a threshold distance of a previous trip endpoint of a previous general route cost request. If such a previous general route cost request can be identified, the current general route cost request can be assigned to the same route worker that handled the previous request. For example, such as route worker may be able to re-use some portion of its cached graph expansion data to streamline the process of generating and costing general routes for the current request.

At operation 1310, the selected route worker generates general routes for local route endpoints indicated by the request. The general routes may be determined in any suitable way. At operation 1312, the batch routing system returns general route costs for the received local route endpoints. The general route costs can include, for example the costs of the general route corresponding to each associated local route endpoint.

Figure 14:
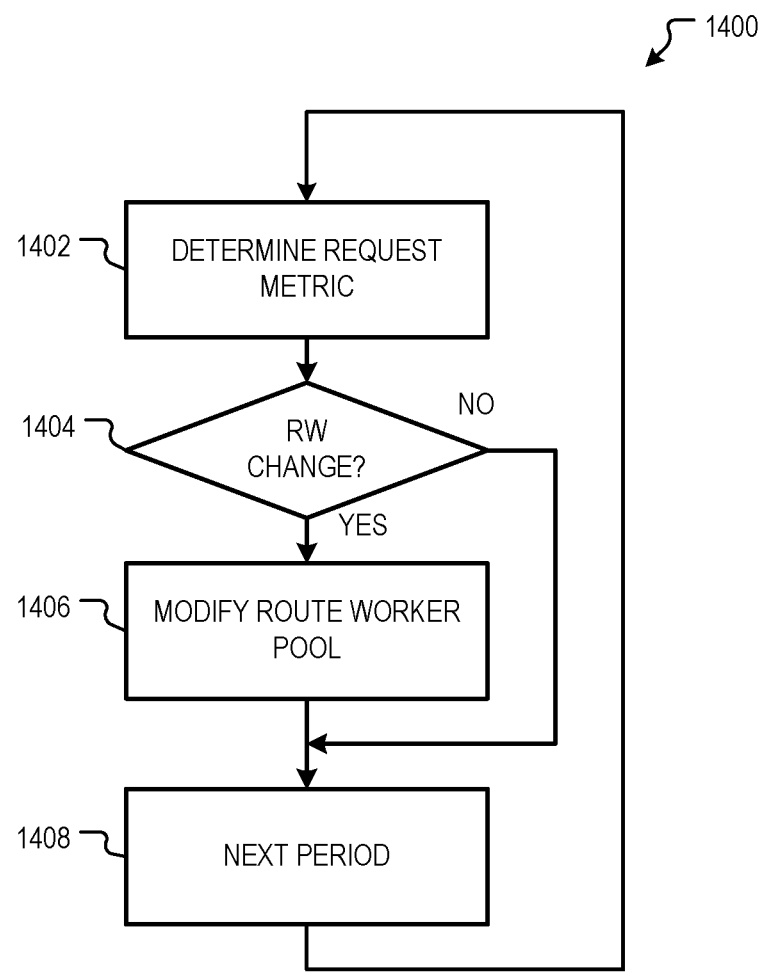
FIG. 14 is a flowchart showing one example of a process flow that can be executed by a batch routing system to manage route workers.

FIG. 14 is a flowchart showing one example of a process flow 1400 that can be executed by a batch routing system, such as the batch routing system 1101 or the batch routing system 1200, to manage route workers. For example, the process flow 1400 can be executed by a pipeline orchestrator or other suitable component that manages route workers.

At operation 1402, the batch routing system determines a request metric. The request metric describes general route cost requests received by the batch routing system. For example, the metric can include a number of requests received and/or a rate of requests received. The metric can also include information about the types of vehicles making general route cost requests. For example, the metric can describe a number of requests being made by vehicles of a first type, a rate of requests made by vehicles of a first type, etc.

At operation 1404, the batch routing system determines if the metric or metrics determined at operation 1402 indicates a change to the pool of route workers currently executed at the batch routing system. A change may be indicated, for example, if requests for a particular location by a particular vehicle type are increasing or decreasing. For example, if general route cost requests relating to a particular routing graph or routing graph portion from vehicles of a first type are increasing, the batch routing system may increase the number of route workers associated with that vehicle type and routing graph. Similarly, if general route cost requests relating to a particular routing graph or routing graph portion from vehicles of a second type is decreasing, the number of route workers associated with that vehicle type and routing graph may be decreased. If a change is indicated, the batch routing system implements the change at operation 1406, for example, by initiating and/or stopping one or more route workers. If no change is indicated, the process returns to operation 1402 at the next period.

At operation 1408, the batch routing system may wait one period (e.g., 1 second, 10 minutes, etc.) and then return to operation 1402. The process flow 1400 may be executed, for example, while the batch routing system is receiving general route cost requests.

Figure 15:
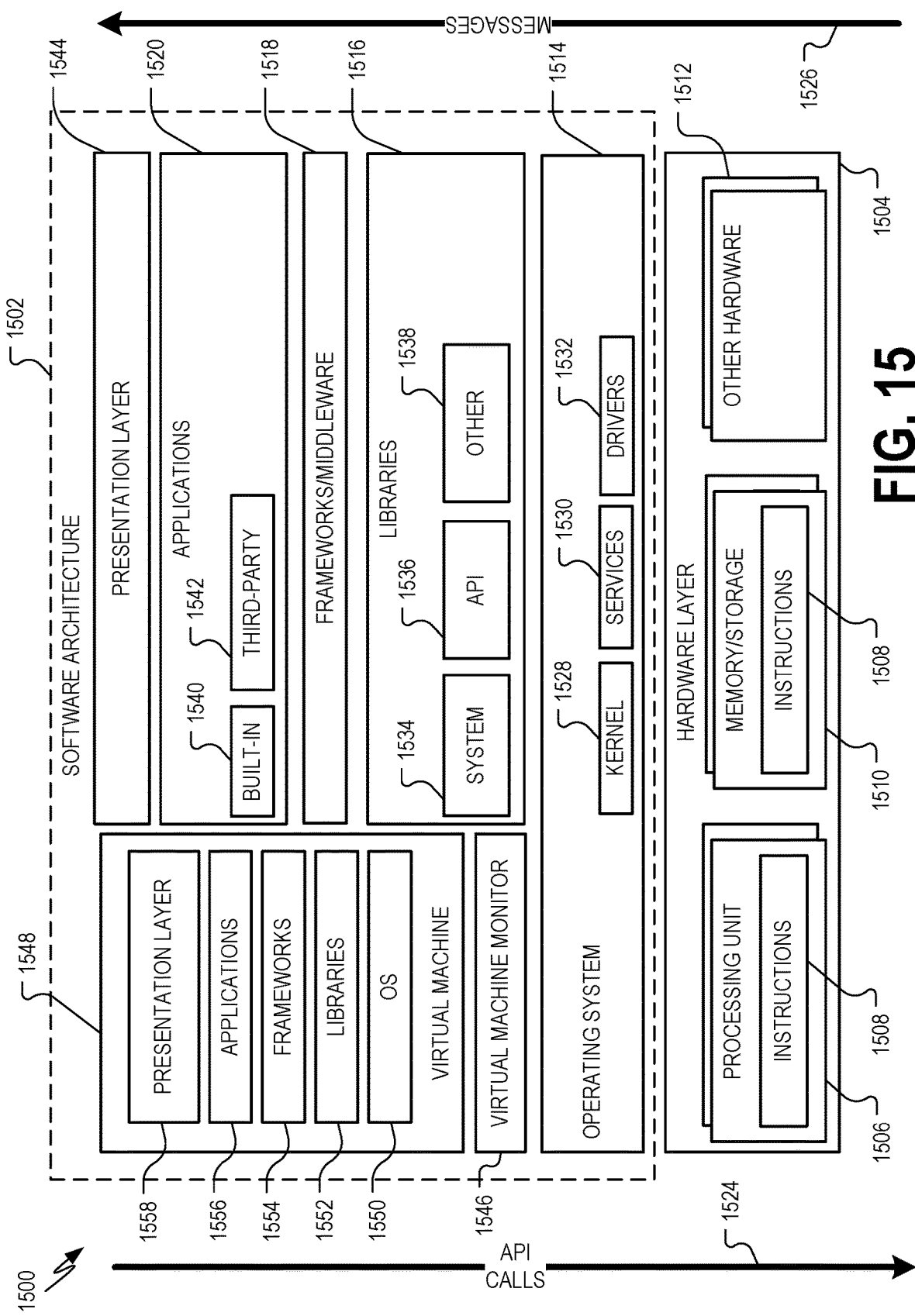
FIG. 15 is a block diagram showing one example of a software architecture for a computing device.

FIG. 15 is a block diagram 1500 showing one example of a software architecture 1502 for a computing device. The software architecture 1502 may be used in conjunction with various hardware architectures, for example, as described herein. FIG. 15 is merely a non-limiting example of a software architecture 1502 and many other architectures may be implemented to facilitate the functionality described herein. A representative hardware layer 1504 is illustrated and can represent, for example, any of the above-referenced computing devices. In some examples, the hardware layer 1504 may be implemented according to an architecture 1600 of FIG. 16 and/or the software architecture 1502 of FIG. 15.

The representative hardware layer 1504 comprises one or more processing units 1506 having associated executable instructions 1508. The executable instructions 1508 represent the executable instructions of the software architecture 1502, including implementation of the methods, modules, components, and so forth of FIGS. 1-5. The hardware layer 1504 also includes memory and/or storage modules 1510, which also have the executable instructions 1508. The hardware layer 1504 may also comprise other hardware 1512, which represents any other hardware of the hardware layer 1504, such as the other hardware illustrated as part of the architecture 1600.

In the example architecture of FIG. 15, the software architecture 1502 may be conceptualized as a stack of layers where each layer provides particular functionality. For example, the software architecture 1502 may include layers such as an operating system 1514, libraries 1516, frameworks/middleware 1518, applications 1520, and a presentation layer 1544. Operationally, the applications 1520 and/or other components within the layers may invoke API calls 1524 through the software stack and receive a response, returned values, and so forth illustrated as messages 1526 in response to the API calls 1524. The layers illustrated are representative in nature and not all software architectures have all layers. For example, some mobile or special-purpose operating systems may not provide a frameworks/middleware 1518 layer, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. In some examples, the services 1530 include an interrupt service. The interrupt service may detect the receipt of a hardware or software interrupt and, in response, cause the software architecture 1502 to pause its current processing and execute an ISR when an interrupt is received. The ISR may generate an alert.

The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), WiFi® drivers, NFC drivers, audio drivers, power management drivers, and so forth depending on the hardware configuration.

The libraries 1516 may provide a common infrastructure that may be used by the applications 1520 and/or other components and/or layers. The libraries 1516 typically provide functionality that allows other software modules to perform tasks in an easier fashion than by interfacing directly with the underlying operating system 1514 functionality (e.g., kernel 1528, services 1530, and/or drivers 1532). The libraries 1516 may include system libraries 1534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be used by the applications 1520 and/or other software components/modules. For example, the frameworks 1518 may provide various graphical user interface (GUI) functions, high-level resource management, high-level location services, and so forth. The frameworks 1518 may provide a broad spectrum of other APIs that may be used by the applications 1520 and/or other software components/modules, some of which may be specific to a particular operating system or platform.

The applications 1520 include built-in applications 1540 and/or third-party applications 1542. Examples of representative built-in applications 1540 may include, but are not limited to, a contacts application, a browser application, a book reader application, a location application, a media application, a messaging application, and/or a game application. The third-party applications 1542 may include any of the built-in applications 1540 as well as a broad assortment of other applications. In a specific example, the third-party application 1542 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1542 may invoke the API calls 1524 provided by the mobile operating system such as the operating system 1514 to facilitate functionality described herein.

The applications 1520 may use built-in operating system functions (e.g., kernel 1528, services 1530, and/or drivers 1532), libraries (e.g., system libraries 1534, API libraries 1536, and other libraries 1538), or frameworks/middleware 1518 to create user interfaces to interact with users of the system. Alternatively, or additionally, in some systems, interactions with a user may occur through a presentation layer, such as the presentation layer 1544. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 15, this is illustrated by a virtual machine 1548. A virtual machine creates a software environment where applications/modules can execute as if they were executing on a hardware computing device. The virtual machine 1548 is hosted by a host operating system (e.g., the operating system 1514) and typically, although not always, has a virtual machine monitor 1546, which manages the operation of the virtual machine 1548 as well as the interface with the host operating system (e.g., the operating system 1514). A software architecture executes within the virtual machine 1548, such as an operating system 1550, libraries 1552, frameworks/middleware 1554, applications 1556, and/or a presentation layer 1558. These layers of software architecture executing within the virtual machine 1548 can be the same as corresponding layers previously described or may be different.

Figure 16:
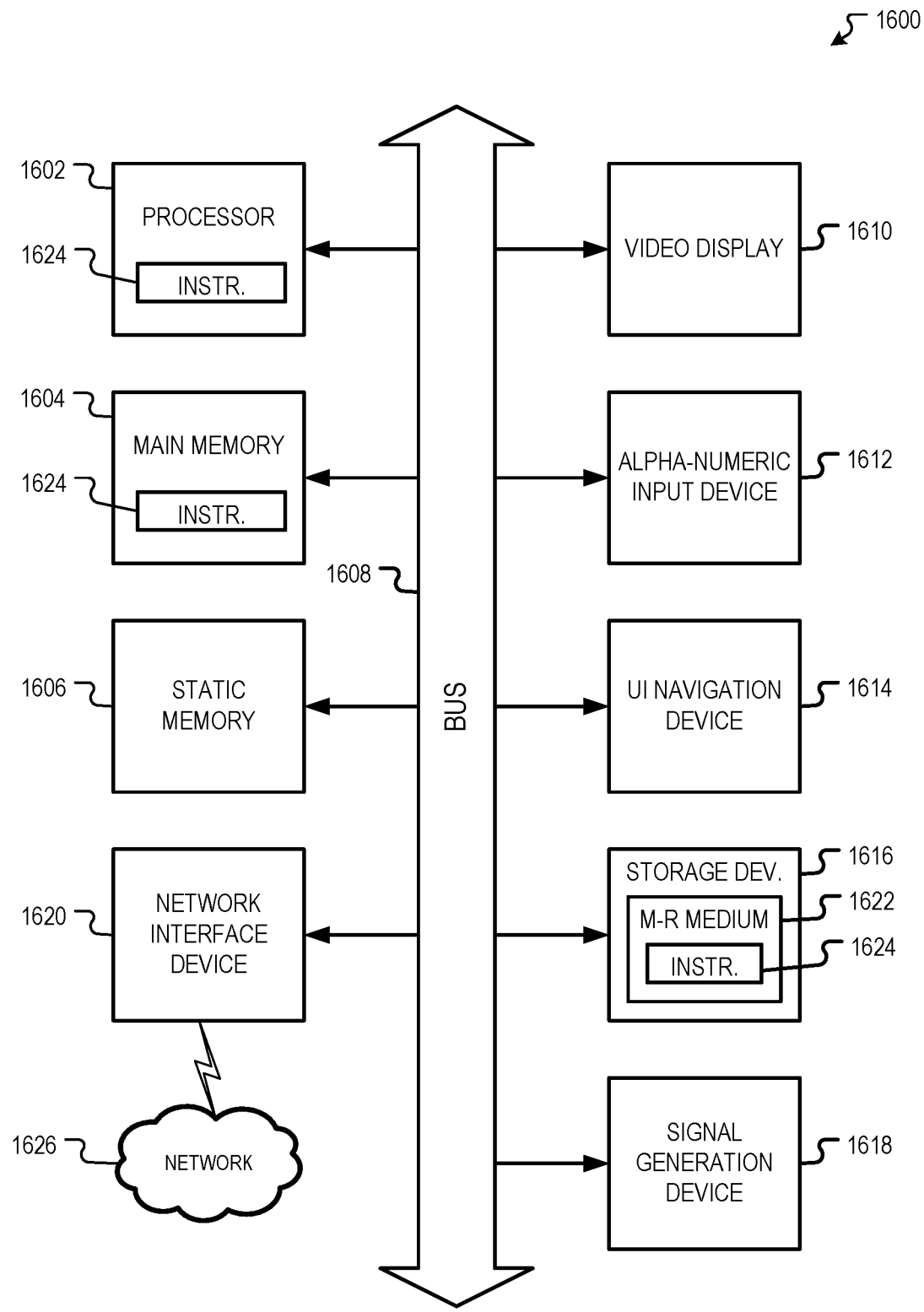
FIG. 16 is a block diagram illustrating a computing device hardware architecture.

FIG. 16 is a block diagram illustrating a computing device hardware architecture 1600, within which a set or sequence of instructions can be executed to cause a machine to perform examples of any one of the methodologies discussed herein. The hardware architecture 1600 describes a computing device for executing the vehicle autonomy system, described herein.

The architecture 1600 may operate as a standalone device or may be connected (e.g., networked) to other machines. In a networked deployment, the architecture 1600 may operate in the capacity of either a server or a client machine in server-client network environments, or it may act as a peer machine in peer-to-peer (or distributed) network environments. The architecture 1600 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1600 includes a processor unit 1602 comprising at least one processor (e.g., a central processing unit (CPU), a graphics processing unit (GPU), or both, processor cores, compute nodes). The architecture 1600 may further comprise a main memory 1604 and a static memory 1606, which communicate with each other via a link 1608 (e.g., bus). The architecture 1600 can further include a video display unit 1610, an input device 1612 (e.g., a keyboard), and a UI navigation device 1614 (e.g., a mouse). In some examples, the video display unit 1610, input device 1612, and UI navigation device 1614 are incorporated into a touchscreen display. The architecture 1600 may additionally include a storage device 1616 (e.g., a drive unit), a signal generation device 1618 (e.g., a speaker), a network interface device 1620, and one or more sensors (not shown), such as a Global Positioning System (GPS) sensor, compass, accelerometer, or other sensor.

In some examples, the processor unit 1602 or another suitable hardware component may support a hardware interrupt. In response to a hardware interrupt, the processor unit 1602 may pause its processing and execute an ISR, for example, as described herein.

The storage device 1616 includes a non-transitory machine-readable medium 1622 on which is stored one or more sets of data structures and instructions 1624 (e.g., software) embodying or used by any one or more of the methodologies or functions described herein. The instructions 1624 can also reside, completely or at least partially, within the main memory 1604, within the static memory 1606, and/or within the processor unit 1602 during execution thereof by the architecture 1600, with the main memory 1604, the static memory 1606, and the processor unit 1602 also constituting machine-readable media.

Executable Instructions and Machine-Storage Medium

The various memories (i.e., 1604, 1606, and/or memory of the processor unit(s) 1602) and/or storage device 1616 may store one or more sets of instructions and data structures (e.g., instructions) 1624 embodying or used by any one or more of the methodologies or functions described herein. These instructions, when executed by processor unit(s) 1602 cause various operations to implement the disclosed examples.

As used herein, the terms "machine-storage medium," "device-storage medium," "computer-storage medium" (referred to collectively as "machine-storage medium 1622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1622 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1624 can further be transmitted or received over a communications network 1626 using a transmission medium via the network interface device 1620 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A method of controlling an autonomous vehicle, comprising:
   generating, by a navigator system at an autonomous vehicle, a plurality of local routes beginning at a vehicle location and extending to a plurality of local route end points, wherein a first local route of the plurality of local routes extends from the vehicle location to a first local route end point of the plurality of local route end points and a second local route of the plurality of local routes extends from the vehicle location to a second local route end point of the plurality of local route end points;
   accessing, by the navigator system, general route cost data, the general route cost data describing general route costs from the plurality of local route end points to a trip end point, wherein a first general route cost describes a cost from the first local route end point to the trip end point and a second general route cost describes a cost from the second local route end point to the trip end point;
   selecting, by the navigator system, the first local route of the plurality of local routes based at least in part on the general route cost data; and
   beginning, by a vehicle autonomy system of the autonomous vehicle, to control the autonomous vehicle along the first local route.

2. The method of claim 1, further comprising determining a total cost for the first local route, the total cost comprising a first local route cost for the first local route and a first general cost from the first local route end point to the trip end point, wherein the selecting of the first local route is also based at least in part on the total cost for the first local route.

3. The method of claim 1, further comprising sending, by a local route planner executing at the navigator system, a general route cost request to a general route planner, the general route cost request comprising the plurality of local route end points.

4. The method of claim 3, wherein the general route planner executes at the autonomous vehicle.

5. The method of claim 4, further comprising:
   determining, by the general route planner, that a remote general route planner is enabled, the remote general route planner executing at a computing device remote from the autonomous vehicle; and
   sending, by the general route planner, a general route cost request to the remote general route planner.

6. The method of claim 3, wherein the general route planner executes at a computing device remote from the autonomous vehicle.

7. The method of claim 1, further comprising:
   generating a candidate local route comprising a vehicle location graph element corresponding to the vehicle location and a first graph element connected to the vehicle location graph element at a routing graph;
   expanding the first graph element to generate a second graph element, wherein the second graph element is added to the candidate local route such that the candidate local route extends from the vehicle location graph element to the second graph element via the first graph element; and
   determining that the second graph element meets at least one termination parameter; and
   returning the candidate local route as the first local route and the second graph element as the first local route end point.

8. The method of claim 7, wherein determining that the second graph element meets the at least one termination parameter comprises determining that the second graph element is more than a threshold distance from the vehicle location graph element.

9. The method of claim 7, wherein determining that the second graph element meets at least one termination parameter comprises determining that the candidate local route including the second graph element comprises more than a threshold number of direction changes.

10. The method of claim 7, further comprising, before returning the candidate local route as the first local route, determining that the second graph element is not already included in the candidate local route.

11. The method of claim 7, further comprising, before returning the candidate local route as the first local route, determining that the candidate local route is without loops.

12. An autonomous vehicle comprising:
    at least one processor; and
    a non-transitory machine-readable medium associated with the at least one processor, the medium comprising instructions thereon that, when executed by the at least one processor, cause the at least one processor to perform operations comprising:
    generating a plurality of local routes beginning at a vehicle location and extending to a plurality of local route end points, wherein a first local route of the plurality of local routes extends from the vehicle location to a first local route end point of the plurality of local route end points and a second local route of the plurality of local routes extends from the vehicle location to a second local route end point of the plurality of local route end points;
    accessing general route cost data, the general route cost data describing general route costs from the plurality of local route end points to a trip end point, wherein a first general route cost describes a cost from the first local route end point to the trip end point and a second general route cost describes a cost from the second local route end point to the trip end point;

selecting the first local route of the plurality of local routes based at least in part on the general route cost data; and beginning to control the autonomous vehicle along the first local route.

13. The autonomous vehicle of claim 12, the operations further comprising determining a total cost for the first local route, the total cost comprising a first local route cost for the first local route and a first general cost from the first local route end point to the trip end point, wherein the selecting of the first local route is also based at least in part on the total cost for the first local route.

14. The autonomous vehicle of claim 12, the operations further comprising sending, by a local route planner executing at the at least one processor, a general route cost request to a general route planner, the general route cost request comprising the plurality of local route end points.

15. The autonomous vehicle of claim 14, wherein the general route planner executes at the at least one processor.

16. The autonomous vehicle of claim 15, the operations further comprising:

determining, by the general route planner, that a remote general route planner is enabled, the remote general route planner executing at a computing device remote from the autonomous vehicle; and sending, by the general route planner, a general route cost request to the remote general route planner.

17. The autonomous vehicle of claim 14, wherein the general route planner executes at a computing device remote from the autonomous vehicle.

18. The autonomous vehicle of claim 12, the operations further comprising:

generating a candidate local route comprising a vehicle location graph element corresponding to the vehicle location and a first graph element connected to the vehicle location graph element at a routing graph;

expanding the first graph element to generate a second graph element, wherein the second graph element is added to the candidate local route such that the candidate local route extends from the vehicle location graph element to the second graph element via the first graph element; and determining that the second graph element meets at least one termination parameter; and returning the candidate local route as the first local route and the second graph element as the first local route end point.

19. The autonomous vehicle of claim 18, wherein determining that the second graph element meets the at least one termination parameter comprises determining that the second graph element is more than a threshold distance from the vehicle location graph element.

20. A non-transitory machine-readable medium having instructions thereon that, when executed by at least one processor, cause the at least one processor to perform operations comprising:

generating a plurality of local routes beginning at a vehicle location and extending to a plurality of local route end points, wherein a first local route of the plurality of local routes extends from the vehicle location to a first local route end point of the plurality of local route end points and a second local route of the plurality of local routes extends from the vehicle location to a second local route end point of the plurality of local route end points;

accessing general route cost data, the general route cost data describing general route costs from the plurality of local route end points to a trip endpoint, wherein a first general route cost describes a cost from the first local route end point to the trip end point and a second general route cost describes a cost from the second local route end point to the trip end point;

selecting the first local route of the plurality of local routes based at least in part on the general route cost data; and beginning to control an autonomous vehicle along the first local route.

\* \* \* \* \*

UNITED STATES PATENT AND TRADEMARK OFFICE
CERTIFICATE OF CORRECTION

PATENT NO. : 11,435,200 B2
APPLICATION NO. : 16/752242
DATED : September 6, 2022
INVENTOR(S) : Nagy et al.

It is certified that error appears in the above-identified patent and that said Letters Patent is hereby corrected as shown below:

In the Claims

In Column 32, Line 29, in Claim 20, delete "endpoint," and insert --end point,-- therefor Signed and Sealed this
Eighth Day of August, 2023

Katherine Kelly Vidal
*Director of the United States Patent and Trademark Office*